United States Patent
Chen et al.

(10) Patent No.: US 12,313,958 B2
(45) Date of Patent: May 27, 2025

(54) INTERCHANGEABLE LENS MODULE

(71) Applicant: GoPro, Inc., San Mateo, CA (US)

(72) Inventors: Chao Chen, San Mateo, CA (US);
Nicholas Vitale, Foster City, CA (US);
Herman Wong, Burlingame, CA (US);
Adrian Santos, Dublin, CA (US)

(73) Assignee: GoPro, Inc., San Mateo, CA (US)

( * ) Notice: Subject to any disclaimer, the term of this patent is extended or adjusted under 35 U.S.C. 154(b) by 917 days.

(21) Appl. No.: 17/347,543

(22) Filed: Jun. 14, 2021

(65) Prior Publication Data

US 2021/0389646 A1 Dec. 16, 2021

Related U.S. Application Data

(60) Provisional application No. 63/039,520, filed on Jun. 16, 2020.

(51) Int. Cl.
*G03B 17/14* (2021.01)
*H04N 23/51* (2023.01)
*H04N 23/55* (2023.01)

(52) U.S. Cl.
CPC ............ *G03B 17/14* (2013.01); *H04N 23/51* (2023.01); *H04N 23/55* (2023.01)

(58) Field of Classification Search
CPC ........ G03B 17/565; G03B 7/20; G03B 17/14; G03B 17/18; G03B 17/566; G03B 2206/00; G03B 17/12; G03B 17/02; H01R 13/2471; H01R 13/213; H04N 23/55; H04N 23/663; H04N 23/00; H04N 23/50; H04N 23/51; H04N 23/57
See application file for complete search history.

(56) References Cited

U.S. PATENT DOCUMENTS

| | | | | |
|---|---|---|---|---|
| 2007/0248356 A1* | 10/2007 | Toji | .......................... | H04N 23/55 396/529 |
| 2019/0121051 A1* | 4/2019 | Byrne | ..................... | H04N 23/51 |
| 2020/0322508 A1* | 10/2020 | Suzuki | .................... | H04N 23/55 |
| 2021/0132470 A1* | 5/2021 | Okada | .................... | H04N 23/54 |

\* cited by examiner

*Primary Examiner* — Lin Ye
*Assistant Examiner* — Tuan H Le
(74) *Attorney, Agent, or Firm* — Young Basile Hanlon & MacFarlane, P.C.

(57) ABSTRACT

An image capture device includes a housing defining a receptacle having a housing electrical interface and a mechanical coupling mechanism coupled to or connected with the housing at a location of the receptacle. The image capture device includes an interchangeable lens module that releases connection with the mechanical coupling mechanism. The interchangeable lens module including a module electrical interface and an imaging sensor. A collar rotatable about the interchangeable lens module and lockable to the mechanical coupling mechanism to secure the interchangeable lens module to the housing and couple the module electrical interface to the housing electrical interface.

20 Claims, 21 Drawing Sheets

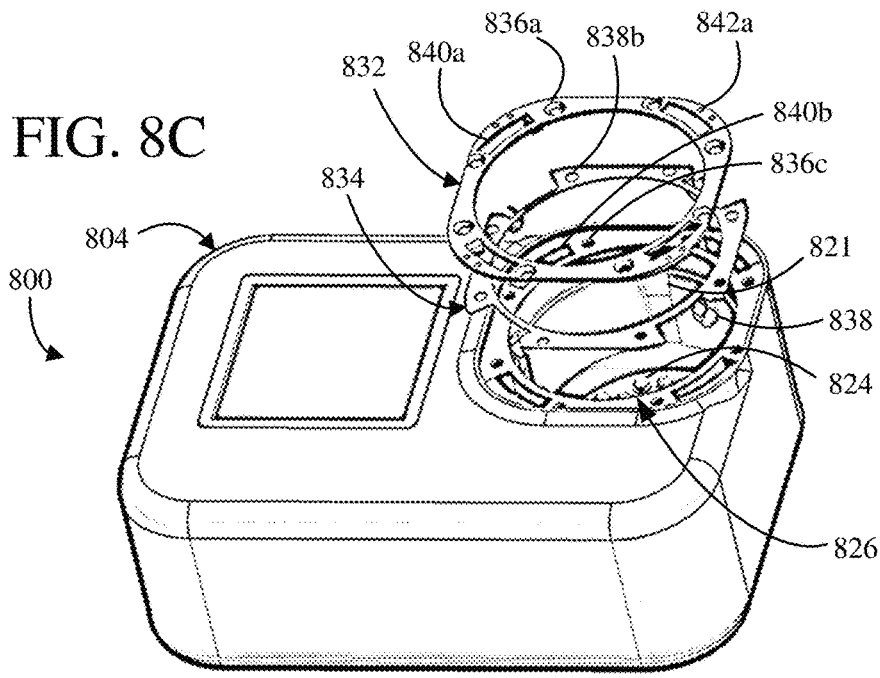
FIG. 8C
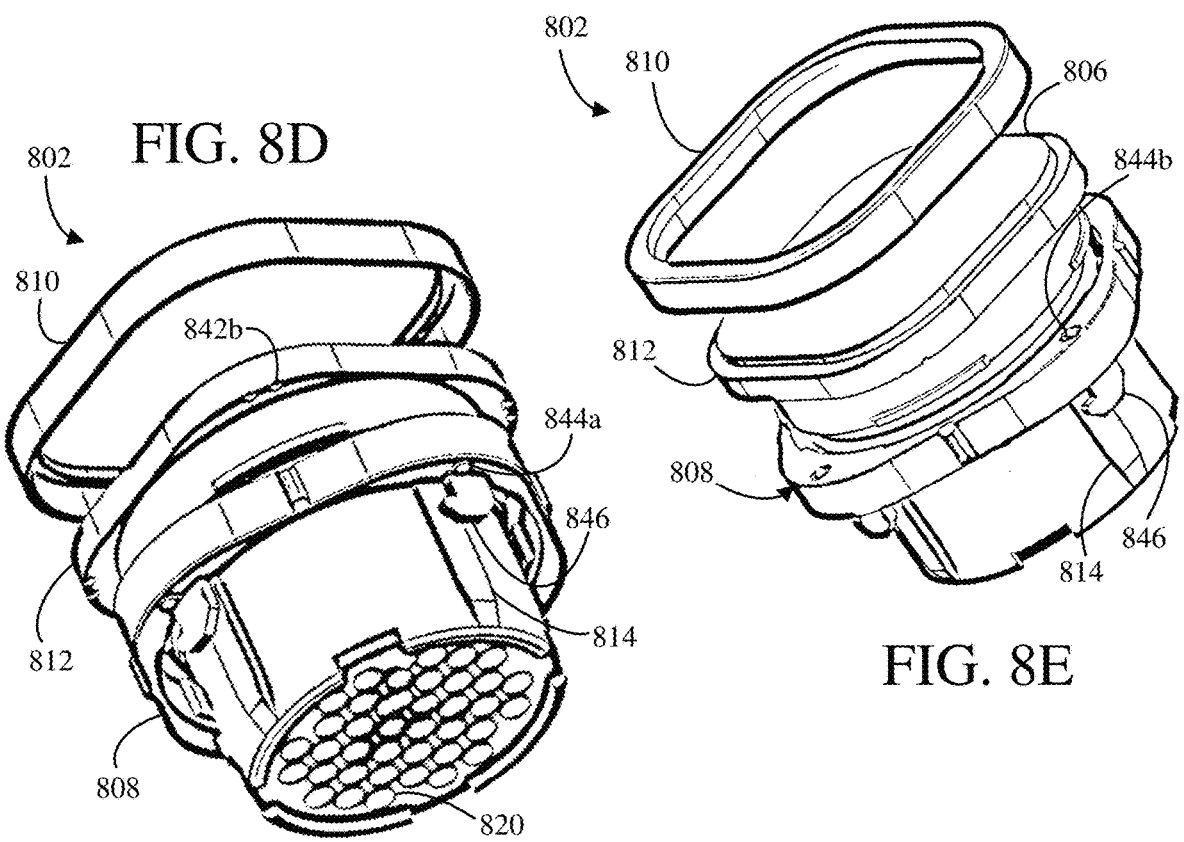
FIG. 8D
FIG. 8E

INTERCHANGEABLE LENS MODULE

CROSS-REFERENCE TO RELATED APPLICATION(S)

This application claims priority to and the benefit of U.S. Provisional Application Patent Ser. No. 63/039,520, filed Jun. 16, 2020, the entire disclosure of which is hereby incorporated by reference.

TECHNICAL FIELD

This disclosure relates to an interchangeable lens module for an image capture device.

BACKGROUND

Image capture devices have a wide range of uses for users that are capturing moments. For example, users often capture images on bike rides, or while skiing, diving, hiking, and surfing. In many cases, a user will desire to capture an image or video in an up close scenario, such as riding a trail on a bike, and capture another image or video at the destination, such as a viewing a mountain side. Usually, image capture devices have a lens assembly that is permanently secured to a housing or body. With the permanent connection, the lens assembly has strong connections to other components in the housing of the image capture device that helps a user take high resolution images. However, with a permanently connected lens assembly, camera enthusiasts often use multiple cameras to capture different angles, panoramas, and landscapes. It would be desirable to have a camera that can capture multiple types of images while withstanding the vigor of outdoor activity.

SUMMARY

Disclosed herein are implementations of an image capture device that includes a housing defining a receptacle having a housing electrical interface and a mechanical coupling mechanism coupled to the housing at a location of the receptacle. The image capture device further includes an interchangeable lens module for a releasable connection with the mechanical coupling mechanism, and the interchangeable lens module includes a module electrical interface. Finally, the image capture device also includes a collar that is rotatable about the interchangeable lens module and lockable to the mechanical coupling mechanism to secure the interchangeable lens module to the image capture device and couple the module electrical interface to the housing electrical interface.

Disclosed herein are implementations of an image capture device that includes a housing defining a receptacle having a housing electrical interface and a bayonet secured to an outer surface of the housing at a location surrounding the receptacle. The image capture device further includes a lens module that includes a lens tube, a lens disposed in the lens tube, an image sensor spaced from the lens along an imaging axis, and a lens module electrical interface spaced from the image sensor along the imaging axis. Finally, the image capture device further includes a frame that surrounds the lens tube, is rotatable about the lens tube, and is lockable to the bayonet such that rotating the frame around the bayonet releases and locks the lens module to the housing.

Disclosed herein are implementations of an image capture device that include a housing defining a receptacle having an electrical connection and a bayonet attached to an outer surface of the housing at a location of the receptacle. The image capture device further includes an interchangeable lens module interface-able with the electrical connection of the housing and a collar that surrounds the interchangeable lens module and is rotatably lockable against the outer surface of the housing by coupling with the bayonet. Finally, the image capture device further includes a button positioned on a surface of the collar that is generally parallel to an imaging axis of the interchangeable lens module. The button has an uncompressed position associated with retaining the collar to the bayonet and a compressed position associated with releasing the collar from the bayonet for removal or installation of the interchangeable lens module from or to the image capture device.

Disclosed herein is an image capture device that includes a housing defining a receptacle having a housing electrical interface and a mechanical coupling mechanism coupled to or connected with the housing at a location of the receptacle. The image capture device includes an interchangeable lens module that releases connection with the mechanical coupling mechanism. The interchangeable lens module including a module electrical interface and an imaging sensor. A collar rotatable about the interchangeable lens module and lockable to the mechanical coupling mechanism to secure the interchangeable lens module to the housing and couple the module electrical interface to the housing electrical interface.

Disclosed herein is an image capture device that includes a housing defining a receptacle having a housing electrical interface at a base of the receptacle. The image capture device includes locks disposed at the base of the receptacle adjacent to the housing electrical interface. The image capture device includes a lens module that includes a lens tube and a lens disposed in the lens tube; an image sensor spaced from the lens along an imaging axis. The lens module includes a lens module electrical interface spaced from the image sensor along the imaging axis and clips positioned around the lens module electrical interface. The image capture device includes a collar that surrounds the lens tube and is rotatable about the lens tube. The collar is securable to the locks so that rotating the collar around the lens tube releases or secures the clips and the locks to insert or remove the lens module to or from the housing.

Disclosed herein is an image capture device that includes a housing defining a receptacle having an electrical connection and a bayonet affixed to a wall of the receptacle. The image capture device includes an interchangeable lens module. The interchangeable lens module includes a lens tube and a lens disposed in the lens tube. The interchangeable lens module includes an image sensor spaced from the lens along an imaging axis and a lens module that electrically interfaces with the electrical connection of the housing. The lens module is spaced from the image sensor along the imaging axis. The image capture device includes a collar that surrounds the interchangeable lens module and is rotatably lockable against the outer surface of the housing by coupling with the bayonet.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8C is an exploded view of the image capture device 800 of FIG. 8A-8B.

FIG. 8D is an exploded view of the ILM 802 of FIGS. 8A and 8B. FIG. 8E is an exploded view of the ILM 802 of FIGS. 8A, 8B, and 8E.

DETAILED DESCRIPTION

The image capture devices described herein provide an interchangeable lens module that is watertight, easily interchangeable in the field, and capable of housing multiple types of lens modules. With an easily removable lens and sensor housing, the image capture device can use multiple interchangeable lens modules to take images with varying angle, resolution, and zoom capabilities. By providing a mounting mechanism(s) that pushes the interchangeable lens module against the electrical connections of the housing, the interchangeable lens module has a strong electrical connection that can be removed and easily switched with another interchangeable lens module that provides the user more situational capabilities, such as a wider angle or higher resolution lens. In conjunction with the forces of the mounting mechanism, the interchangeable lens module includes a strategic seal(s) that ensure switching the interchangeable lens module does not allow water to interfere with the camera lens, sensor, electrical interface, or any combination thereof. While switching or interchanging a different interchangeable lens module, the mounting mechanism, a locating feature, or both assist with aligning the electrical interfaces of the interchangeable lens module and the body of the image capture device so that image quality does not suffer due to connection issues.

Figure 1A:
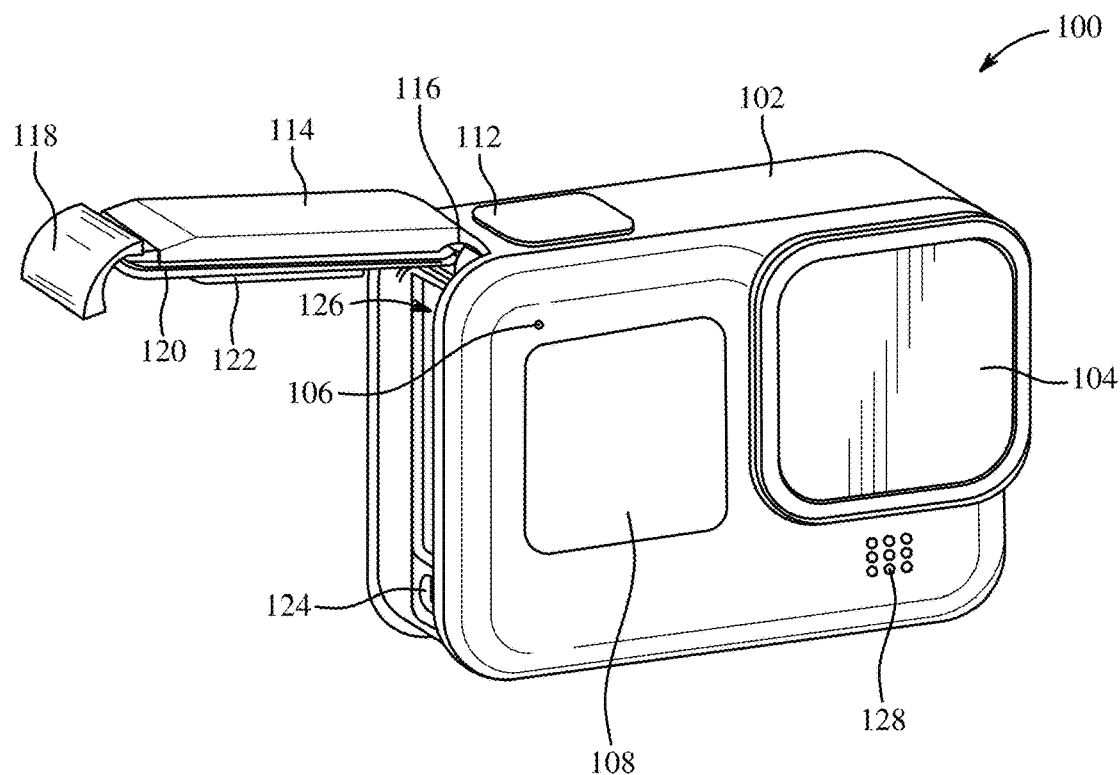
FIGS. 1A-B are isometric views of an example of an image capture device.
Figure 1B:
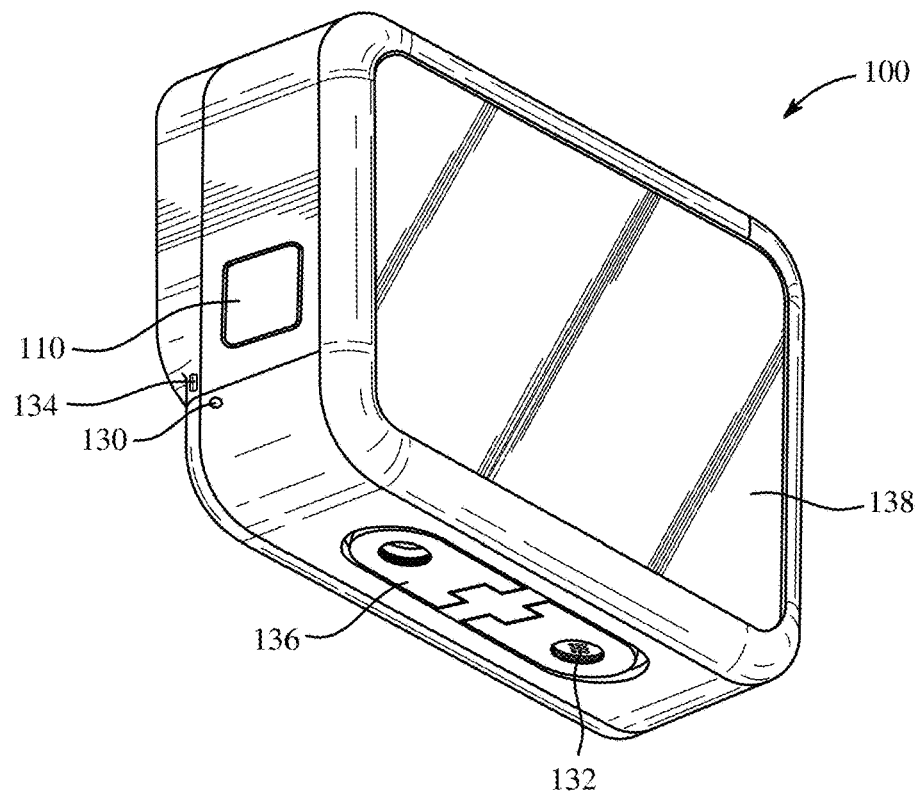

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens

104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
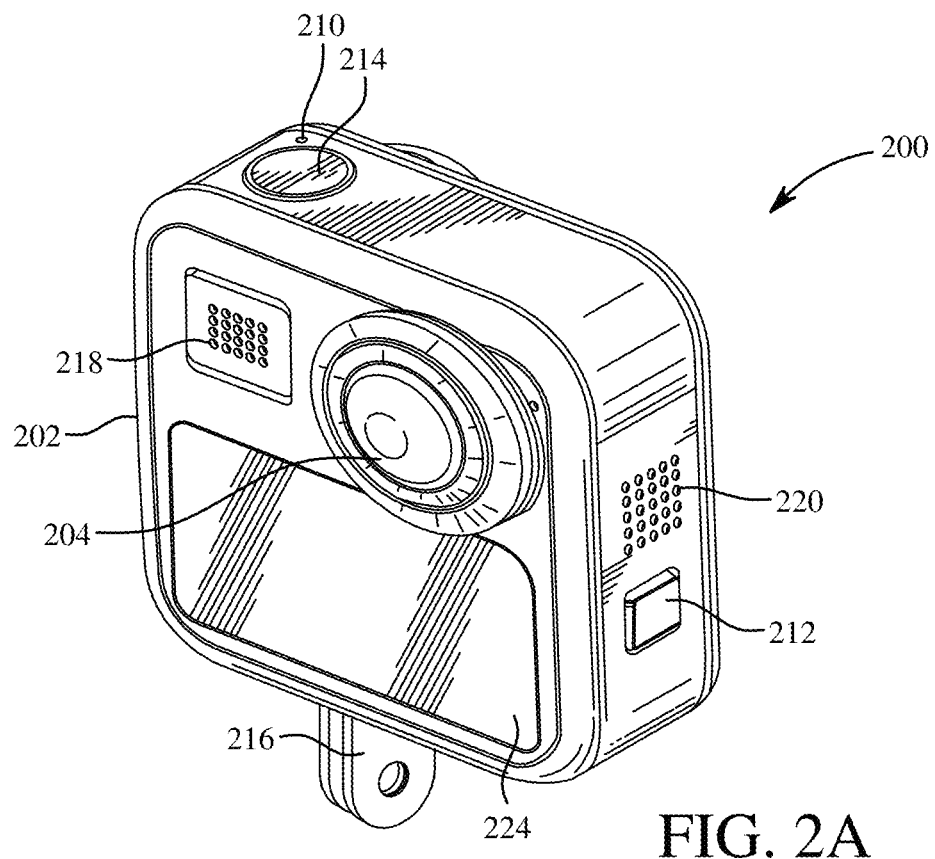
FIGS. 2A-B are isometric views of another example of an image capture device.
Figure 2B:
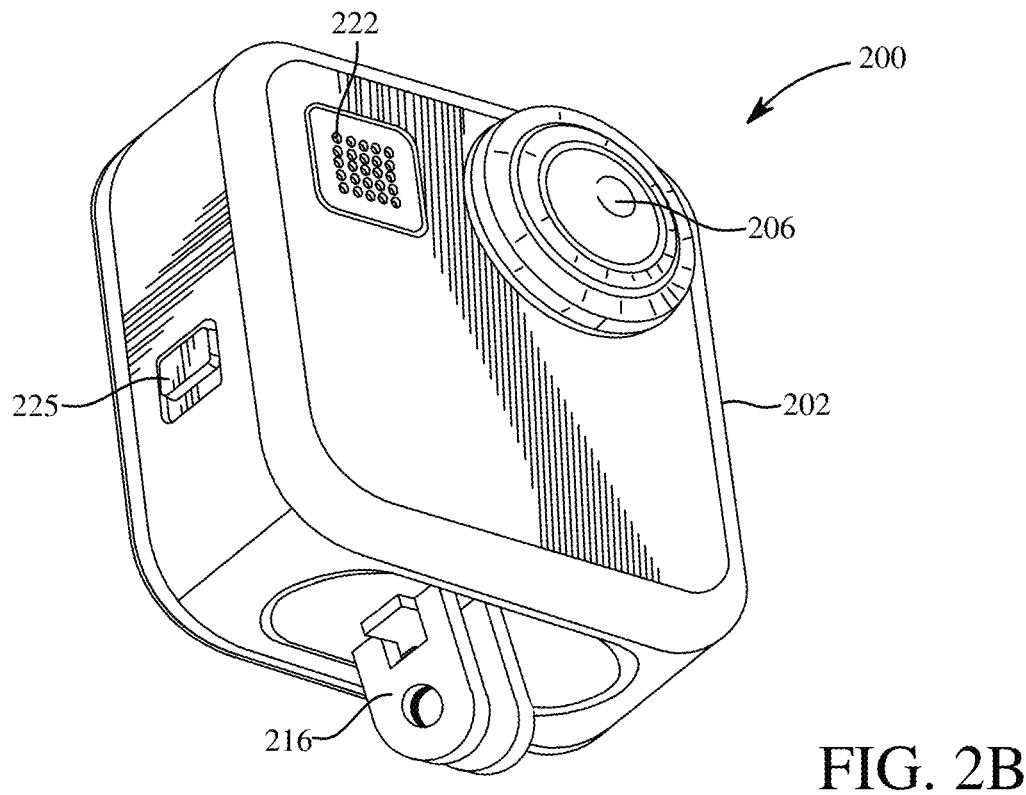

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
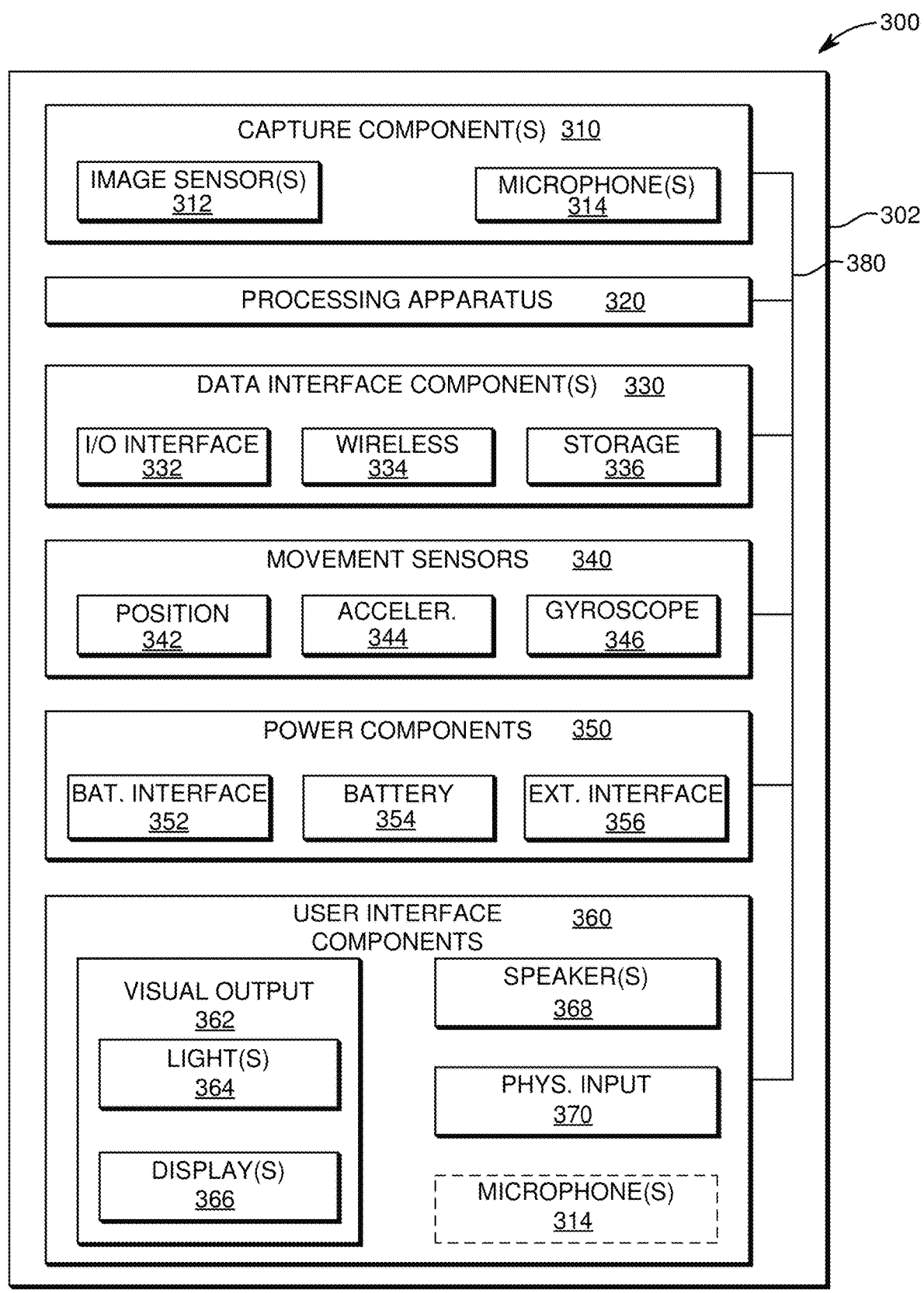
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4A:
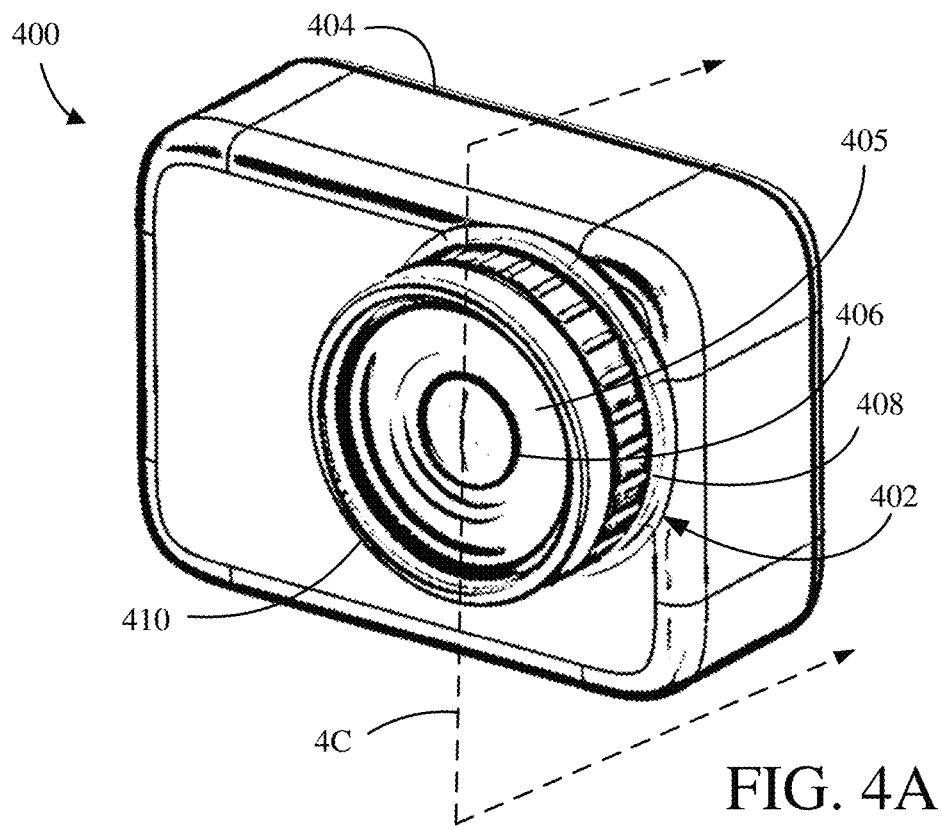
FIG. 4A is a perspective view of an image capture device 400 with an interchangeable lens module (ILM) 402 that is threaded.

FIG. 4A is a perspective view of an image capture device 400, such as the image capture devices 100, 200 of FIGS. 1-2B, with an interchangeable lens module (ILM) 402 that is threaded. Connected to the ILM 402, a body 404, such as the bodies 102, 202 of FIGS. 1 and 2, houses or contains multiple components for capturing image and provides a base for the ILM 402. The bodies 102, 202, 404 or any other body described herein may also be described as a housing. For protecting internal components of the ILM 402 from outside factors, such as dust, dirt, water, or moisture, a cover lens 405 is positioned over the lens 406 at a front end of the ILM 402. As a releasable mounting mechanism between the image capture device 400 and the ILM 402, a collar 408 connects to and/or surrounds a frame 410 of the ILM 402. The collar 408 may be integral to the frame 410; the collar 408 may be a separate part; or the collar 408 may include one or more connection parts that allow the collar 408 to rotate about the frame 410 and a connection feature of the body 404 so that the ILM 402 is releasably connectable to the body 404. As the collar 408 is screw-able or rotatable about a central axis of the ILM 402, a user can lock the collar 408 and know with a reasonable certainty that the ILM 402 is secure because the collar does not screw any farther.

Figure 4B:
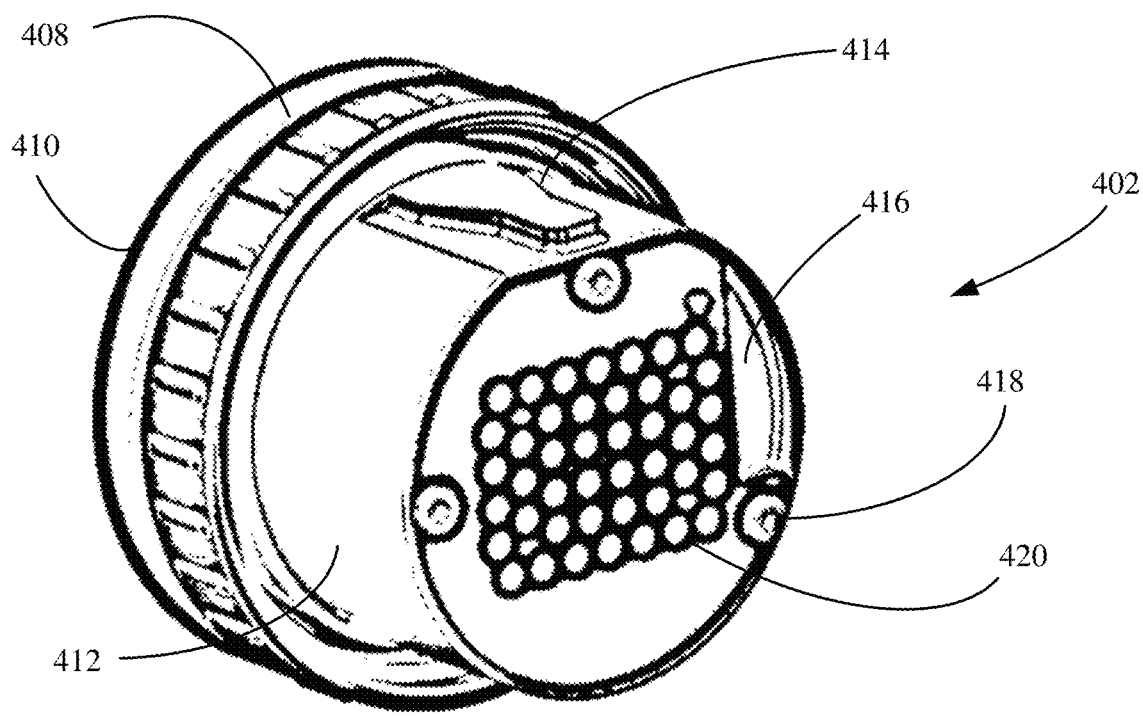
FIG. 4B is a perspective view of the ILM 402 of FIG. 4A.

FIG. 4B is a perspective view of the ILM 402 of FIG. 4A. Surrounding internal components and providing an internal contact point with the body 404, a shell 412 of the ILM 402 includes a locator 414 for aligning the ILM 402 inside of the body 404 of the image capture device 400. The locator 414 is useful to alert the user that a proper connection is being made between the ILM 402 and the body 404. At the bottom end of the ILM 402, a plate 416 covers an image sensor 422 (FIC. 4C) within the ILM 402 and connects, by fasteners 418, a module electrical interface 420 and the ILM 402 so that electrical signals are exchangeable between the body 404 and the ILM 402. As the image sensor 422 may provide electromagnetic interference among components of the image capture device 400, the plate 416 provides a buffer between the image sensor 422 and the module electrical interface 420 so that any electromagnetic interference does not disrupt communications between the ILM 402 and the body 404, which would interfere with capturing quality images. For making an electrical connection between the ILM 402 and the body 404, the module electrical interface 420 may be a printed circuit board that includes one or more electrical connection features that are mate-able with another electrical connection feature, such as pads, pogo pins, or a plug.

Figure 4C:
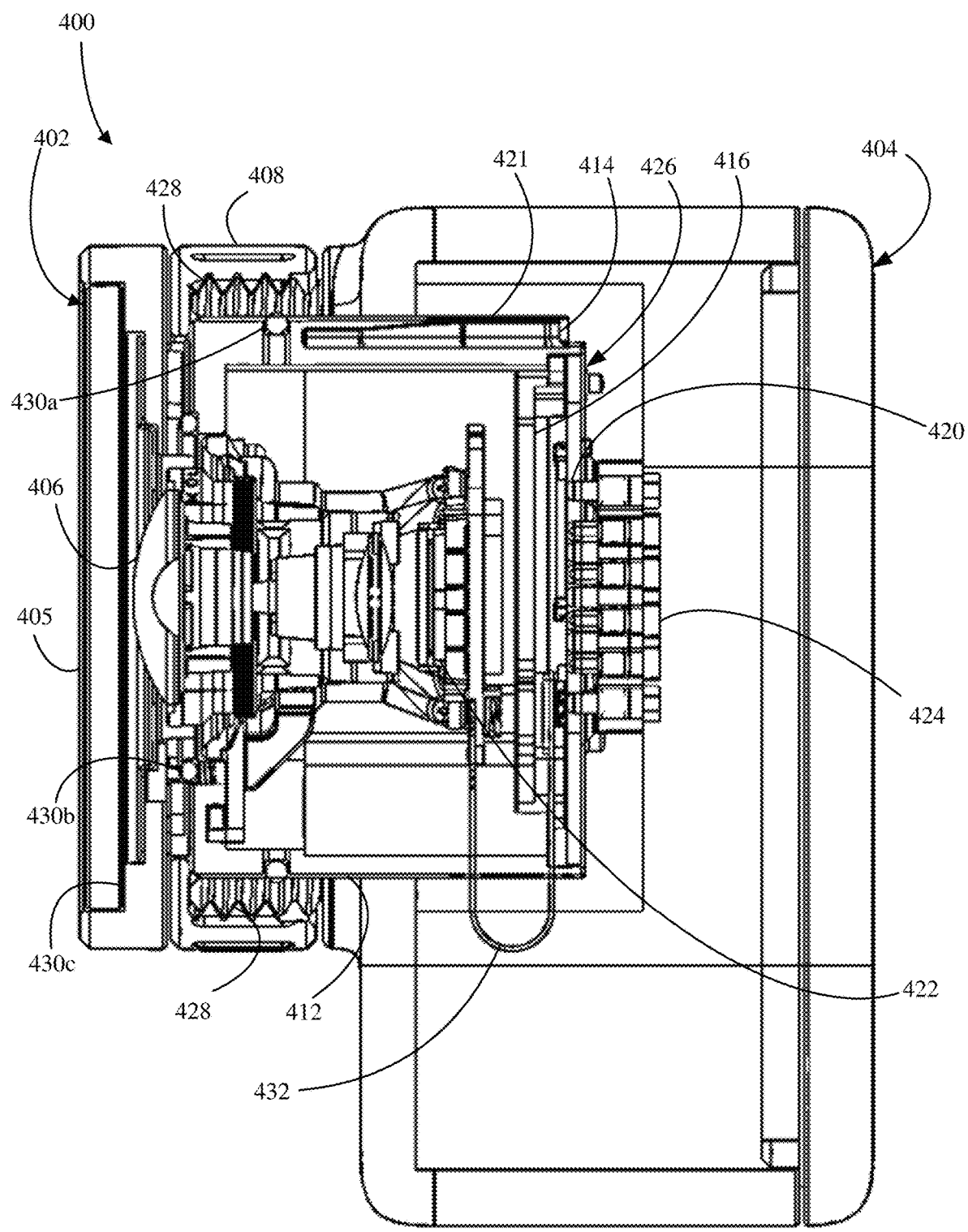
FIG. 4C is a cross-section of a side view of the ILM 402 of FIGS. 4A-B connected to the image capture device 400 as indicated by dotted cross-sectional line 4C viewed from the left side of the image capture device 400 in FIG. 4A.

FIG. 4C is a cross-section of a side view of the ILM 402 of FIGS. 4A-B connected to the image capture device 400 as indicated by dotted cross-sectional line 4C viewed from the left side of the image capture device 400 in FIG. 4A. A slot 421 of the body 404 receives the locator 414 of the ILM 402 as the ILM 402 is inserted into body 404. Located inside the ILM 402, the image sensor 422 is shown encased by the shell 412 of the ILM 402 and is illustrated with a space between the plate 416 and the image sensor 422 so that electromagnetic interference from the image sensor 422 to the module electrical interface 420 and a housing electrical interface 424 is mitigated. Further, the plate 416 prevents impact between the image sensor 422 and the module electrical interface 420 upon connection to the housing electrical interface 424. Defined within the body 404, a receptacle 426 houses the shell 412 of the ILM 402. For securing the ILM 402 to the body 404, the collar 408 rotatably interfaces with threads 428 extending outwardly from a wall of the receptacle 426 so that rotating or screwing the collar 408 will lock or release the ILM 402 from the receptacle 426.

For preventing water entry to the inner portion of the receptacle 426, a seal 430a is provided around the shell 412 of the ILM 402. The seal 430a can be formed from a rubber or elastic material that surrounds the shell 412 and provides a watertight or friction fit with the receptacle 426. For providing a water barrier for the image sensor 422, another seal 430b is provided between the shell 412 and the frame 410. As protection for the lens 406, another seal 430c, which may be an adhesive, is positioned between the cover lens 405 and the frame 410. In conjunction with use of the seals 430a, 430b, 430c, the ILM 402 is both removable from or insert-able into the receptacle 426 and watertight. In some examples, a watertight seal is formed when the ILM 402 is inserted into the receptacle 426. In other examples, a watertight seal is formed when the ILM 402 is inserted into the receptacle 426 and the collar 408 is locked around the threads 428.

As the collar 408 is locked around the threads 428, the module electrical interface 420 is pushed into the housing electrical interface 424 so that an electrical connection, contact, or interface is securely formed. When the electrical connection is formed, signals may be sent between components inside the body 404 and the image sensor 422 through a wire 432 that is configured to send signals. For example, signals may be sent between the components when an operation to capture an image is initiated or completed.

Figure 5A:
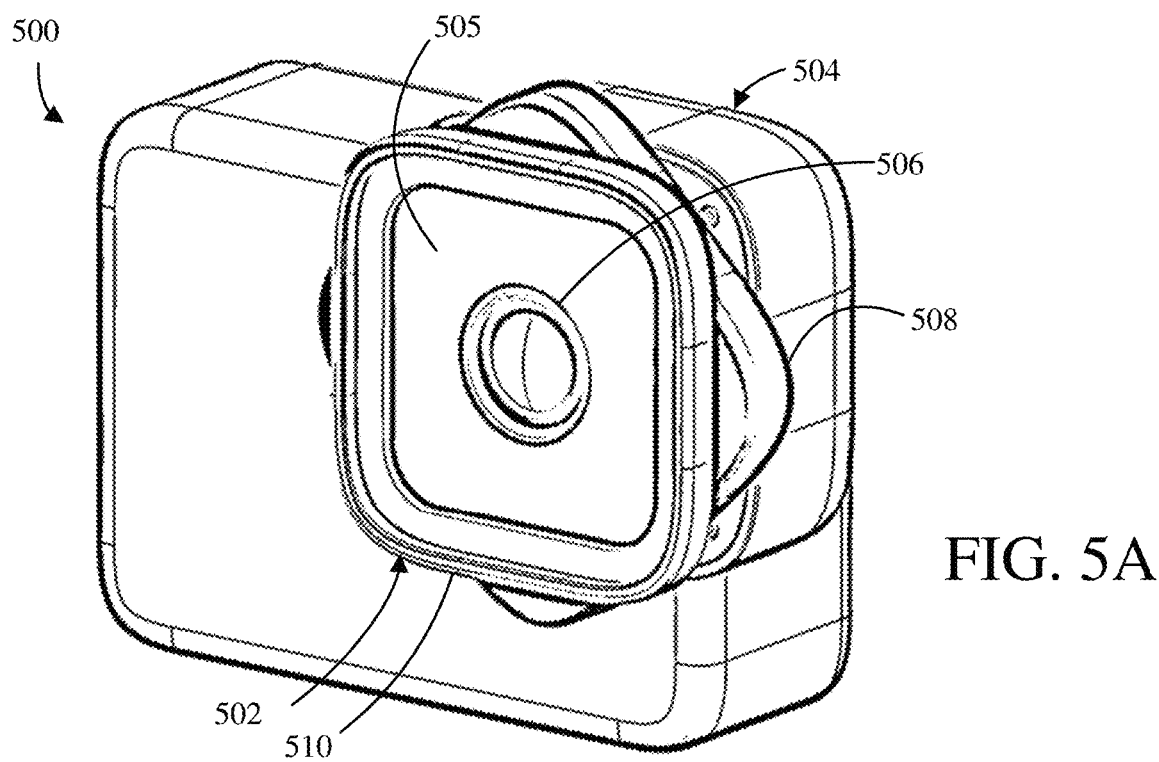
FIG. 5A is a perspective view of an image capture device 500 with an ILM 502 in an unlocked position.
Figure 5B:
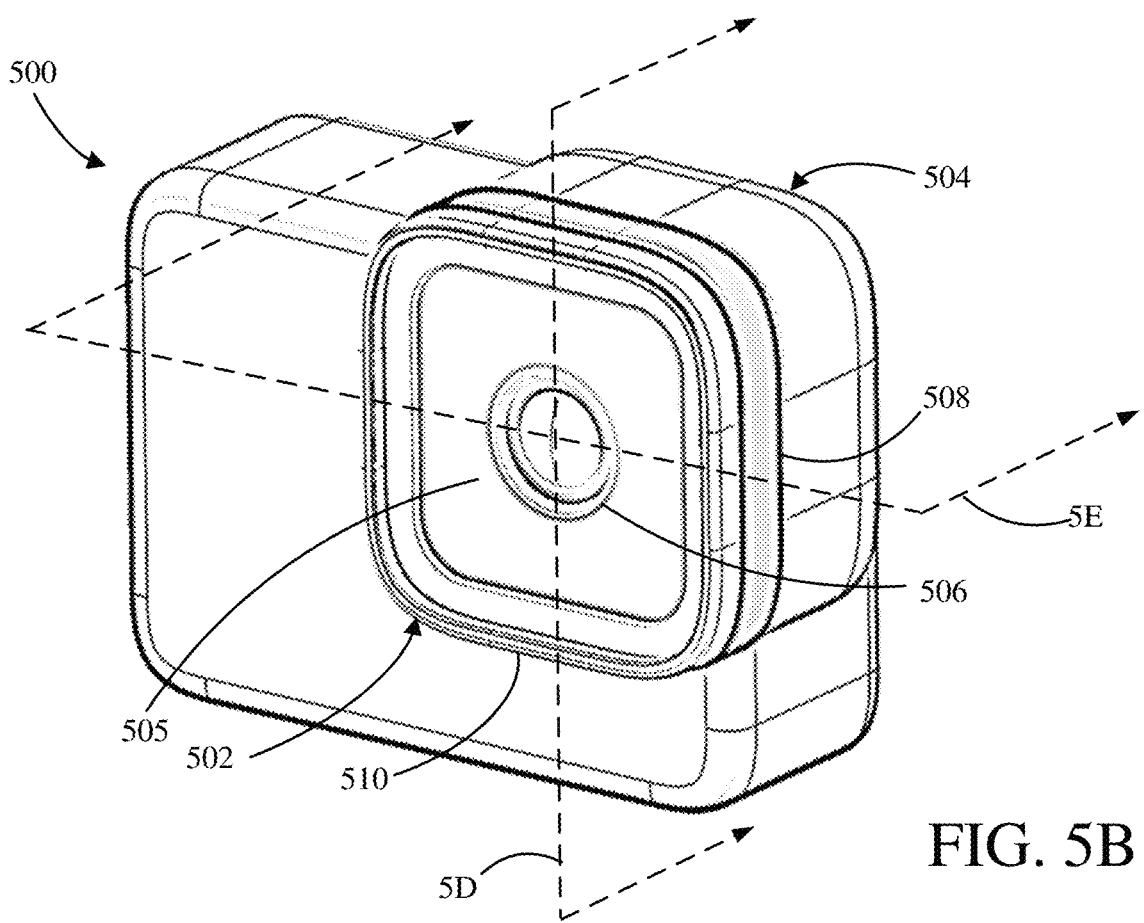
FIG. 5B is another perspective view of the image capture device 500 of FIG. 5A with the ILM 502 in a locked position.

FIG. 5A is a perspective view of an image capture device 500, such as the image capture devices 100, 200 of FIGS. 1-2B, with an ILM 502 in an unlocked position. FIG. 5B is another perspective view of the image capture device 500 of FIG. 5A with the ILM 502 in a locked position. For connecting with a body 504, the ILM 502 of the image capture device 500 includes a cover lens 505 and a lens 506 that are non-rotatable when the ILM 502 is inserted into the body 504. The insert-ability of the ILM 502 into the body 504 is useful because more than one type of ILM can be interchanged and added to the body 504. In the unlocked position, a collar 508 is rotated about 45 degrees relative to a frame 510 that is non-rotatable and surrounds the lens 506 of the ILM 502 so that the frame 510 and the collar 508 are offset relative to each other. The collar 508 may be rotated clockwise, counterclockwise, or both so that the ILM 502 may be locked or unlocked (i.e., released) from the body 504 in an easy fashion. In some examples, the collar 508 may be rotated about 7 degrees to about 65 degrees relative to the frame 510 to unlock or lock the ILM 502 from the body 504 depending on the inner workings of a mounting mechanism associated with the collar 508. However, in this example, the collar 508 rotates relative to the frame 510 at about a 45 degree angle.

Figure 5C:
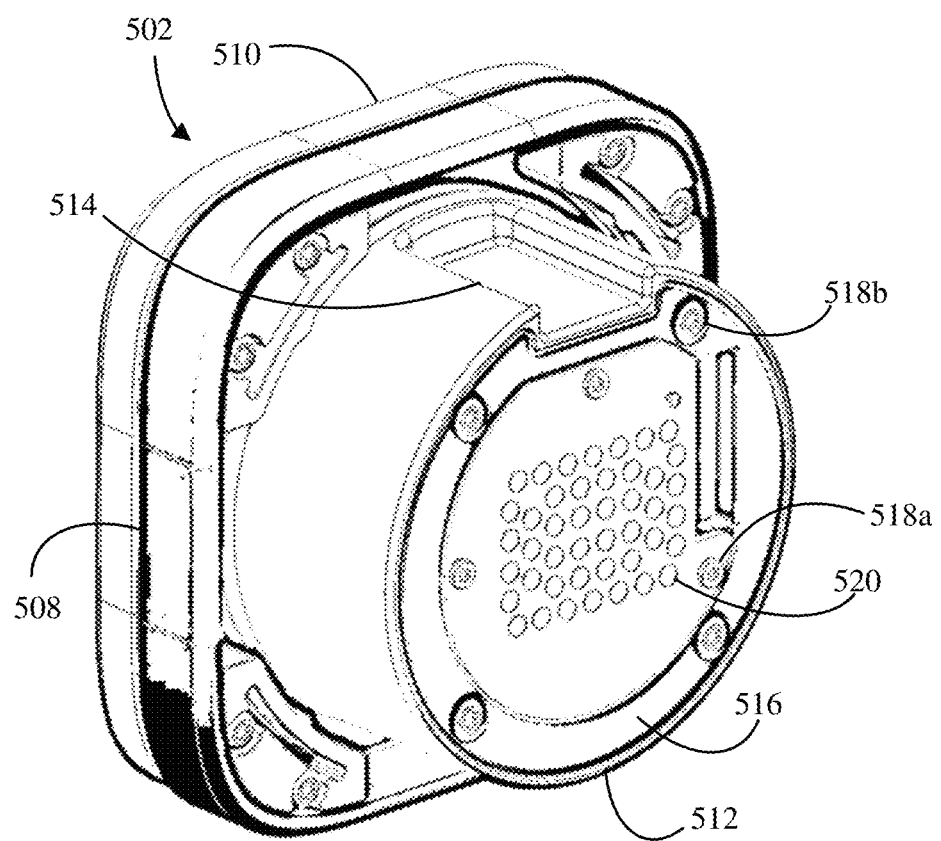
FIG. 5C is a perspective view of the ILM 502 of FIGS. 5A-5B.

FIG. 5C is a perspective view of the ILM 502 of FIGS. 5A-5B. For aligning the ILM 502 to the body 504, a shell 512 includes a locator 514 formed as a depression into the shell 512 that may interface with a slot 515 (FIG. 5E) on the body 504. The locator 514 and the slot 515 are useful to ensure that the ILM 502 is oriented correctly in the body 504. On a back-side of the ILM 502, a plate 516 encloses the ILM 502 in conjunction with the shell 512 so that internal components are not exposed to outside factors, such as water, air, dust, dirt, or any combination thereof. For securing the plate 516 against portions of the shell 512, fasteners 518a, 518b connect or adhere portions of the plate 516, the shell 512, and a module electrical interface 520 is configured to form an electrical connection with the body 504, which may be similar to the module electrical interface 420 of FIG. 4. Specifically, the fastener 518a secures the module electrical interface 520 against the plate 516, and the fastener 518b secures the plate 516 against the ILM 502 so that the plate 516, the fastener 518b, and the module electrical interface 520 are non-rotatable and secured together. The fasteners 518a, 518b may be screws, nails, glue, pins, adhesive, bolts, or any combination thereof so that a mechanical connection is made among the components. In other examples, the plate 516 and the shell 512 may be integrally formed without fasteners.

Figure 5D:
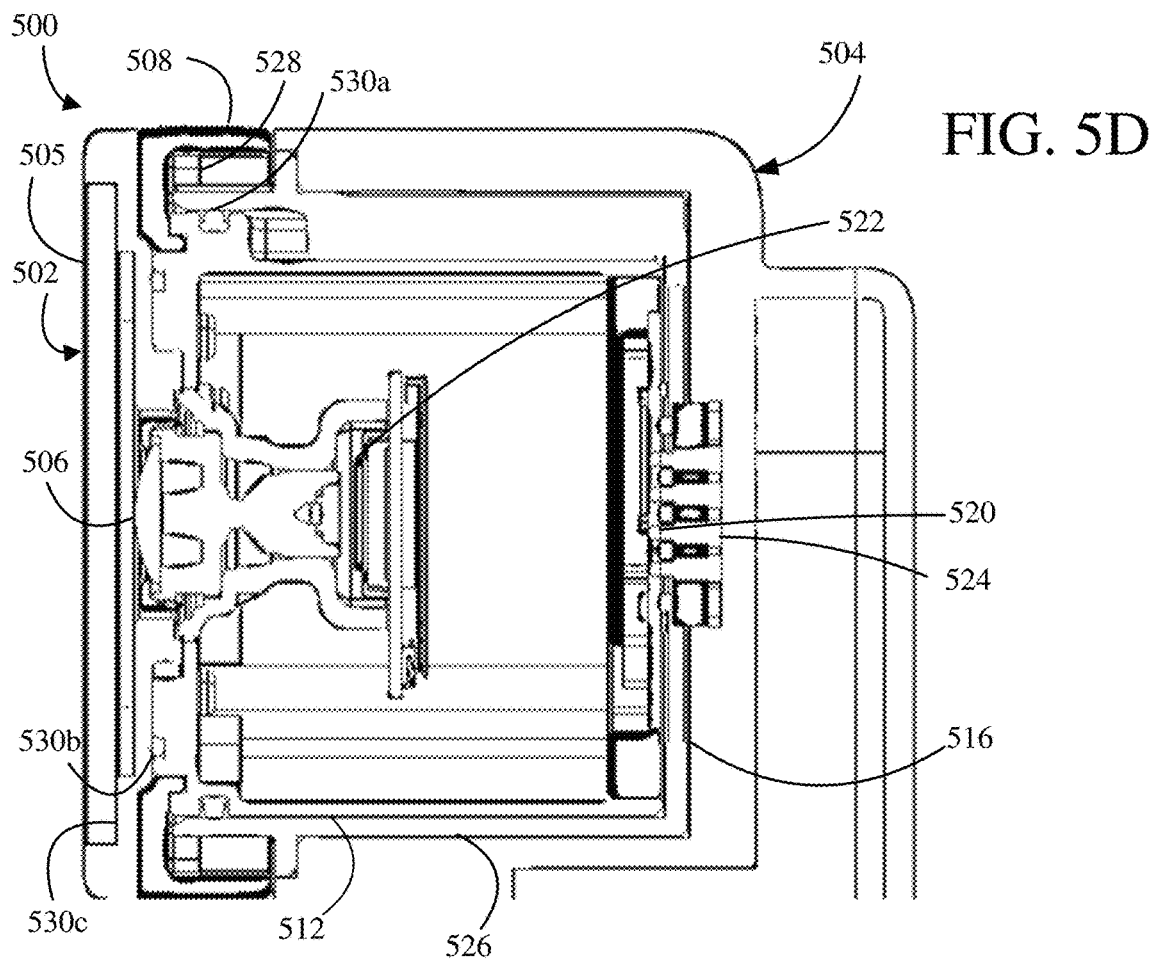
FIG. 5D is a cross section of a side view of the image capture device 500 and the ILM 502 of FIGS. 5A-5C as indicated by dotted cross-sectional line 5D viewed from the left side of the image capture device 500 in FIG. 5B.

FIG. 5D is a cross section of a side view of the image capture device 500 and the ILM 502 of FIGS. 5A-5C as indicated by dotted cross-sectional line 5D viewed from the left side of the image capture device 500 in FIG. 5B. Connected with the lens 506 for capturing images, an image sensor 522 is shown between walls of the shell 512 so that the image sensor 522 is free of physical interaction with external forces or factors such as physical impact, dust, dirt, water, moisture, or any combination thereof. Keeping out external forces or factors helps to keep connections between components, such as the module electrical interface 520, in good working order. For sending electrical signals, a wire or connector (not shown) connects the image sensor 522 and the module electrical interface 520. At an outside surface of the plate 516, the module electrical interface 520 makes an electrical contact, connection, or interface with a housing electrical interface 524 by inserting the ILM 502 into a receptacle 526. The housing electrical interface 524 and the module electrical interface 520 may be similar to the housing electrical interface 424 and the module electrical interface 420 of FIG. 4. As the ILM 502 is locked or secured into the receptacle 526 by the collar 508, a pressure or a force in the z-direction against the housing electrical interface 524 is applied that assists the electrical connection or interface between the module electrical interface 520 and the housing electrical interface 524. Specifically, the pressure or the force in the z-direction is applied when the collar 508 is locked into place and a leaf spring 528 interfaces with a portion of the receptacle 526. As described herein, z-directional forces may be described as forces or pressure traveling a direction parallel to an imaging axis of ILM 502 when the ILM 502 is coupled to the image capture device 500.

On an outer edge of the shell 512, a seal 530a provides a friction or watertight fit with the receptacle 526, and water, dust, dirt, moist air, or any combination thereof is prevented from interfering with internal components of the image capture device 500, such as the module electrical interface 520, the housing electrical interface 524, or both. The seal 530a extends along an outer edge of the shell 512 in a substantially circular or radial shape so that the seal 530a provides a three hundred and sixty degree friction or watertight fit between the shell 512 and the receptacle 526. Between the frame 510 and the shell 512, another seal 530b is provided that mitigates or prevents entry of water, dust, dirt, or moist air so that the image sensor 522 or other components of the ILM 502 are protected. In a substantially circular or radial shape, the seal 530b provides a three hundred and sixty degree friction or watertight fit around the lens 506. For preventing external interference with the lens 506, such as dirt, dust, impact events, water, or any combination thereof, another seal 530c is positioned between the frame 510 and the cover lens 505. The seals 530a, 530b, 530c may have similar characteristics as the seals 430a, 430b, 430c of FIG. 4C.

Figure 5E:
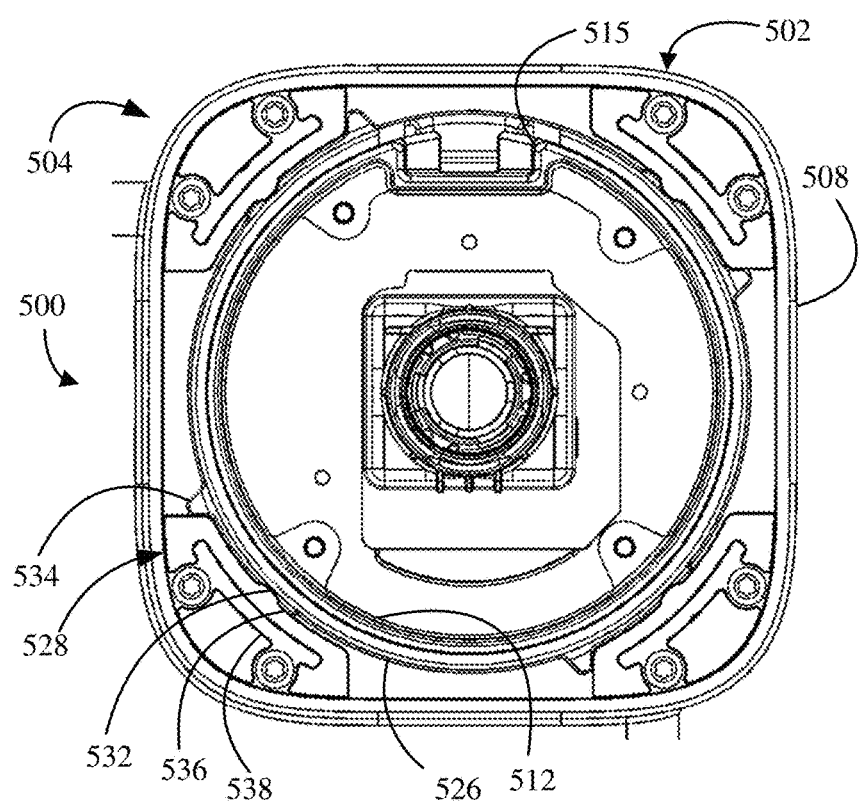
FIG. 5E is a cross section of a front view of the image capture device 500 and the ILM 502 of FIGS. 5A-5D as indicated by dotted cross-sectional line 5E viewed from the back side of the image capture device 500 in FIG. 5B.
Figure 5F:
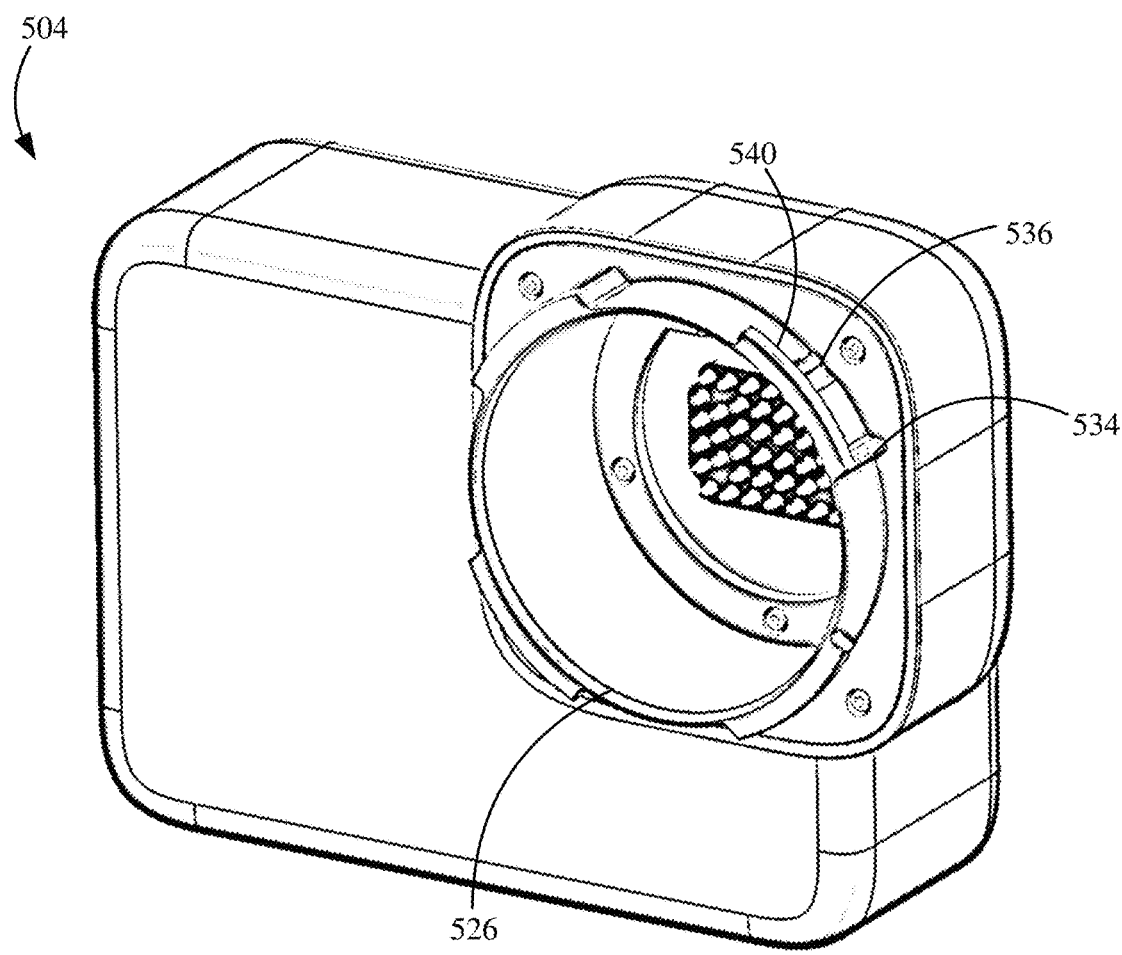
FIG. 5F is a perspective view of the body 504 of FIGS. 5A-5B and 5D-5E.

FIG. 5E is a cross section of a front view of the image capture device 500 and the ILM 502 of FIGS. 5A-5D as indicated by dotted cross-sectional line 5E viewed from the back side of the image capture device 500 in FIG. 5B. FIG. 5F is a perspective view of the body 504 of FIGS. 5A-5B and 5D-5E. To interface or connect the ILM 502 and the body 504, the shell 512 is inserted into the receptacle 526 so that the receptacle 526 is between the shell 512 and the leaf spring 528. The leaf spring 528 includes a detent 532, and on an edge of the receptacle 526, a stopper 534 and an indicator 536 interface with the leaf spring 528 to form a mechanical connection that prevents or inhibits rotational motion. When the leaf spring 528 is interfaced or connected with the receptacle 526, the detent 532 is positioned between the stopper 534 and the indicator 536 so that the detent 532 is aligned with a central axis of a corner of the collar 508.

When between the stopper 534 and the indicator 536, the leaf spring 528 secures and/or holds the ILM 502 inside the receptacle 526. In contact with the stopper 534, a shelf portion 540 shown in FIG. 5F is attached to the receptacle 526 to inhibit z-directional movement of the leaf spring 528. To release the collar 508 from the receptacle 526, the collar 508 is rotated a distance counterclockwise (or clockwise) to a position that is free of contact with the shelf portion 540 so that a snap sound is heard or the change in contact is felt as haptic feedback as the detent 532 of the leaf spring 528 crosses the indicator 536. Even though the indicator 536 physically obstructs the rotational path of the detent 532, the detent 532 is rotationally movable past the indicator 536 because the leaf spring 528 is compressible at a space 538 proximate to the detent 532 as shown in FIG. 5E. When the leaf spring 528 crosses the shelf portion 540, the leaf spring 528 is no longer obstructed in a z-direction, and thus, the ILM 502 is removable from the receptacle 526. The combination of features in the leaf spring 528 provides a useful mechanism to confirm for a user that the image capture device 500 is securely connected and ready for use or that the ILM 502 and the body 504 are safely separable without damaging other components.

Figure 5G:
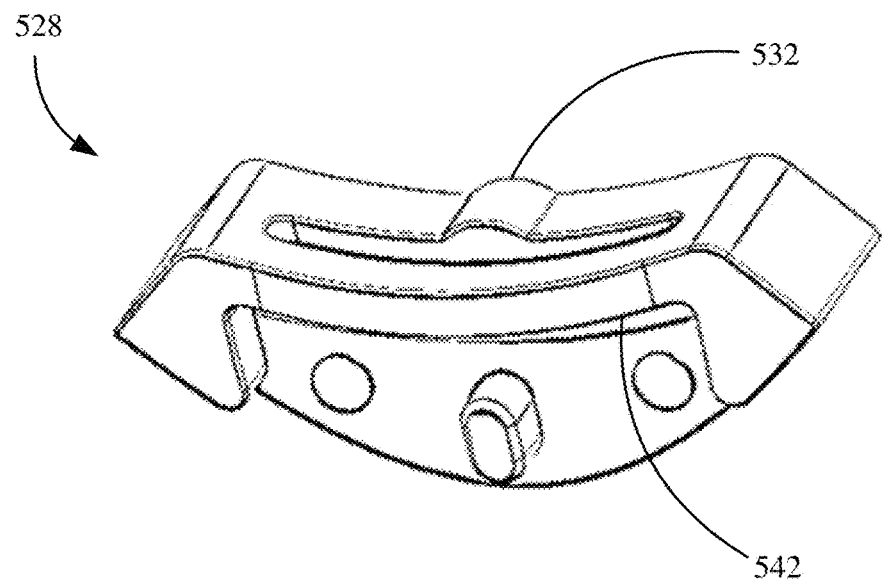
FIG. 5G is a perspective view of a leaf spring 528 of FIGS. 5D-5E.

FIG. 5G is a perspective view of the leaf spring 528 of FIGS. 5D-5F. Above the detent 532, an upper spring 542 functions to prevent z-directional movement of the ILM 502 by interfacing with the shelf 540 of the receptacle 526 shown in FIG. 5F. In this way, the detent 532 prevents movement of the ILM 502 radially by interfacing with the indicator 536 and the stopper 534, and the upper spring 542 prevents z-directional movement of the ILM 502.

Figure 6A:
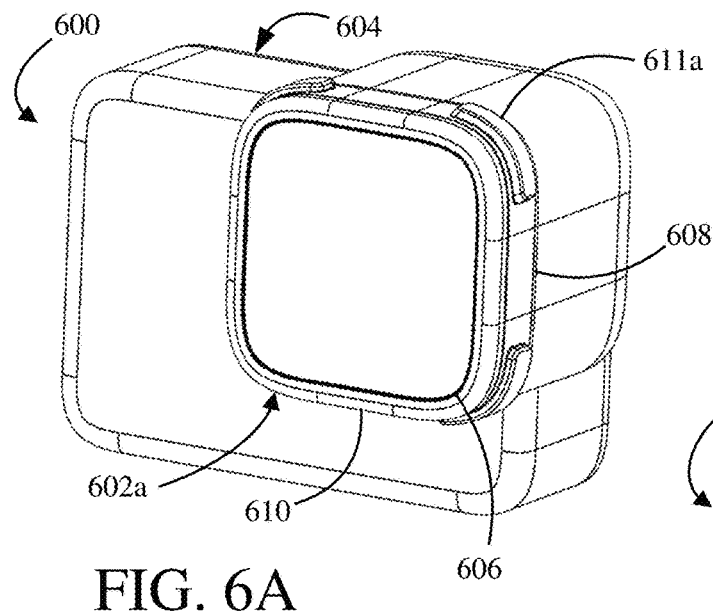
FIG. 6A is a perspective view of an image capture device 600 and an ILM 602a in a locked position.

FIG. 6A is a perspective view of an image capture device 600, such as the image capture devices 100, 200 of FIGS. 1-2B, and an ILM 602a in a locked position. The image capture device 600 can be similar to the image capture devices 100, 200 of FIGS. 1-2B. The image capture device 600 may include similar internal components as image capture devices 100, 200, 400, 500 of FIGS. 1-2B and 4A-5E. A body 604 of the image capture device 600 receives image data through a lens 606 positioned on a distal end of the ILM 602a. For locking and unlocking the ILM 602a from the body 604, a collar 608 is rotatable around a shell (not shown), such as the shells 412, 512 of FIGS. 4A-5E. The collar 608 rotates relative to the frame 610 in a similar configuration and degree to the collars 408, 508 and frames 410, 510 of FIGS. 4A-5E. For example, the collar 608 may rotate relative to the frame 610 at about a 15 degree angle to about a 90 degree angle. In this example, the collar 608 rotates relative to the frame 610 at about a 45 degree angle. To assist with rotating the collar 608, protrusions 611a are included on an outer edge of the collar 608 so that a user can grip the protrusions 611a and rotate the collar 608 relative to the frame 610 and the body 604. In this example, the protrusions 611a are positioned on a corner of the collar 608 and extend along sides (e.g., at the intersection of a top side and a lateral side) so when a user grips the protrusions 611a the user can be free of contact with the frame 610, the body 604, or both. In this way, rotatability of the collar 608 is made easier for the user, and the protrusions 611a expedite the process of interchanging the ILM 602a.

Figure 6B:
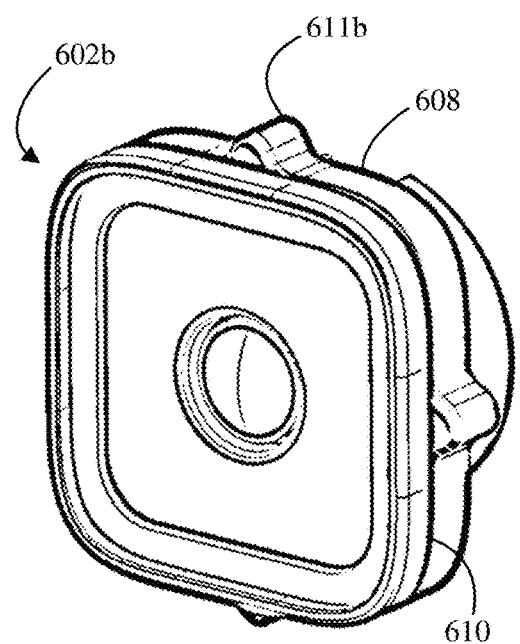
FIG. 6B is a perspective view of another ILM 602b that is in a locked position and is insert-able into the image capture device 600 of FIG. 6A.

FIG. 6B is a perspective view of another ILM 602b that is in a locked position and is insert-able into the image capture device 600 of FIG. 6A. In this example, when in a locked positioned, the ILM 602b includes protrusions 611b on the collar 608 that are pointed and positioned at a center of a side of the collar 608 (e.g., a top side or a lateral side). As the protrusions 611b are pointed and extend outward from the collar 608, the protrusions 611b are easier to grip by a user, and thus, unlocking and/or locking the collar 608 is conducted without a user's hand making contact with the frame 610. When the collar 608 is rotated relative to the frame 610 to an unlocked position, the protrusions 611b rotate closer to one of the corners.

Figure 7:
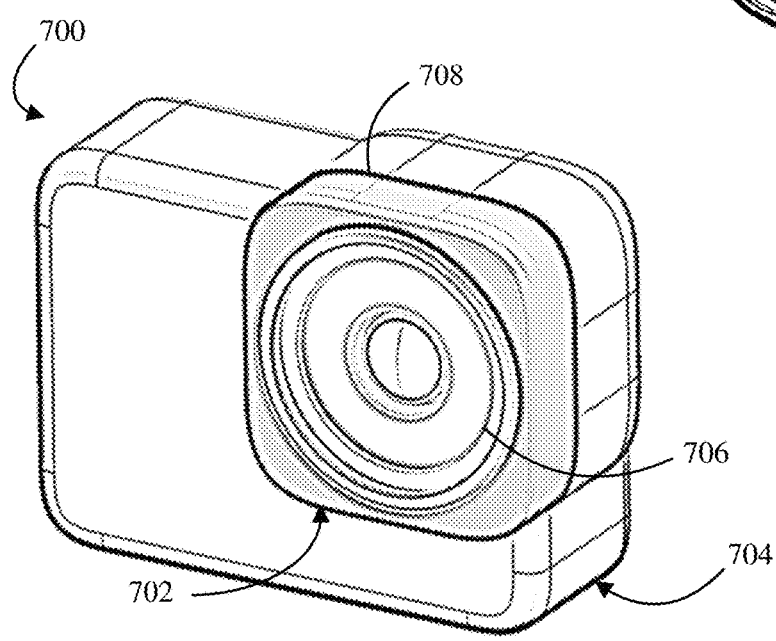
FIG. 7 is a perspective view of an image capture device 700 and an ILM 702.

FIG. 7 is a perspective view of an image capture device 700, such as the image capture devices 100, 200 of FIGS. 1-2B, and an ILM 702. A body 704 of the image capture device 700 is positioned behind a front surface of a lens 706 and a collar 708, and a user's fingers can rotate the collar 708, which is square in shape, around the lens 706, which is circular or round in shape, and can avoid contact with any other components. Because the lens 706 has a circular shape and the collar 708 has a square shape, a user can easily grip and rotate the collar 708 to about 15 degrees, about 30 degrees, or about 45 degrees in reference to a vertical axis (or a horizontal axis, not shown) without contacting the lens 706 or the body 704 and, thus, unlock the ILM 702 from the image capture device 700. In this example, the collar 708 is rotatable about 45 degrees and may rotate in a similar way as the collars 408, 508, 608 of FIGS. 4A-6B, and the image capture device 700 may include similar internal components as the image capture devices 100, 200, 400, 500, 600 of FIGS. 1-2B and 4A-6B.

Figure 8A:
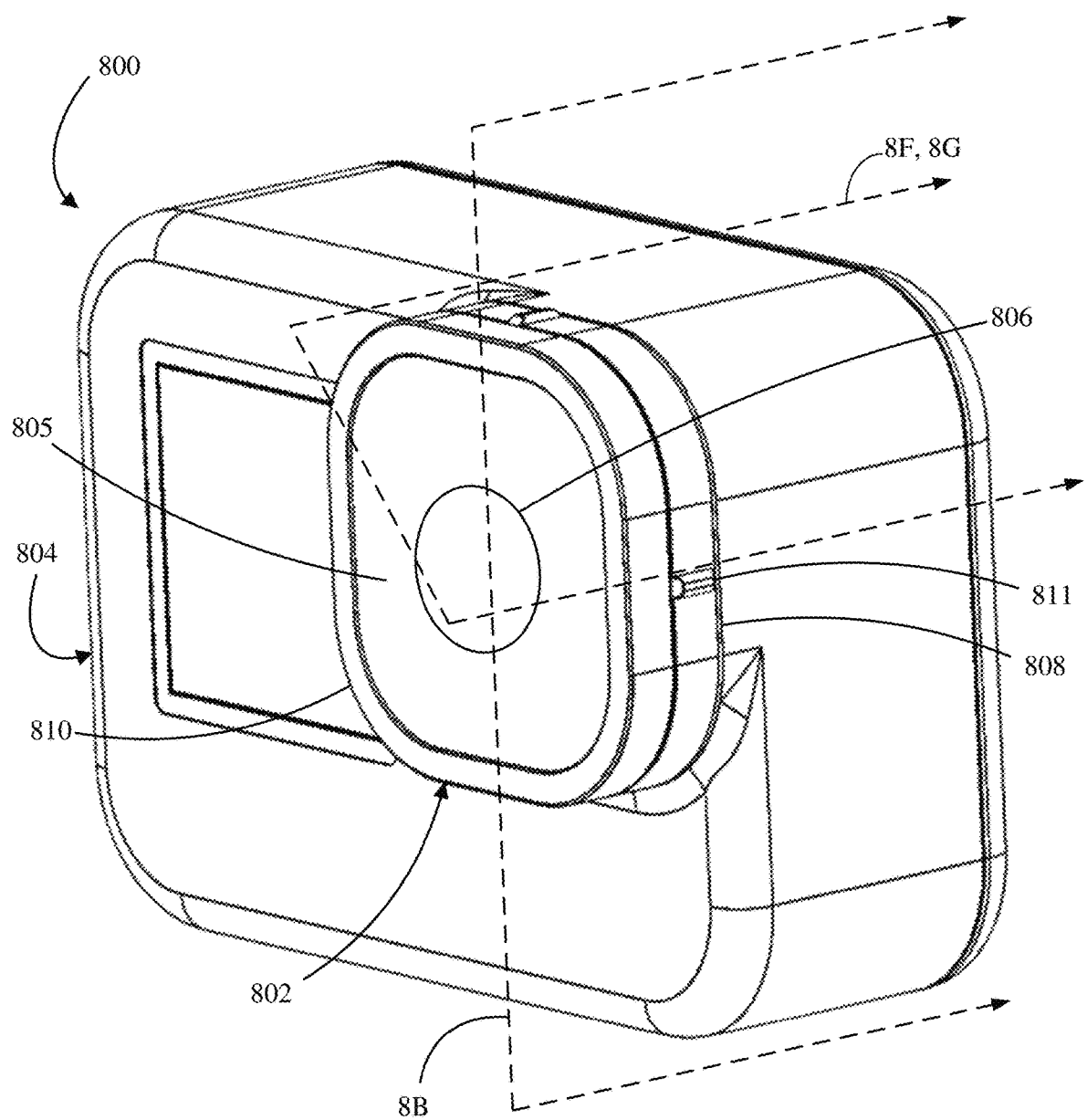
FIG. 8A is a perspective view of an image capture device 800 and an ILM 802.

FIG. 8A is a perspective view of an image capture device 800, such as the image capture devices 100, 200 of FIGS. 1-2B, and an ILM 802. Between a body 804 and an external combination of a cover lens 805 and a lens 806, a collar 808 rotates relative to a frame 810 and the body 804 so that the ILM 802 is releasable from the body 804 of the image capture device 800. When a user engages with the collar 808, a protrusion(s) 811 sits proud on an outer surface of the collar 808 and allows the user to engage the collar while being free of contact with the frame 810, the body 804, or both. This engagement system provides an easier and expedited connection or detachment of the ILM 802 from the image capture device 800.

Figure 8B:
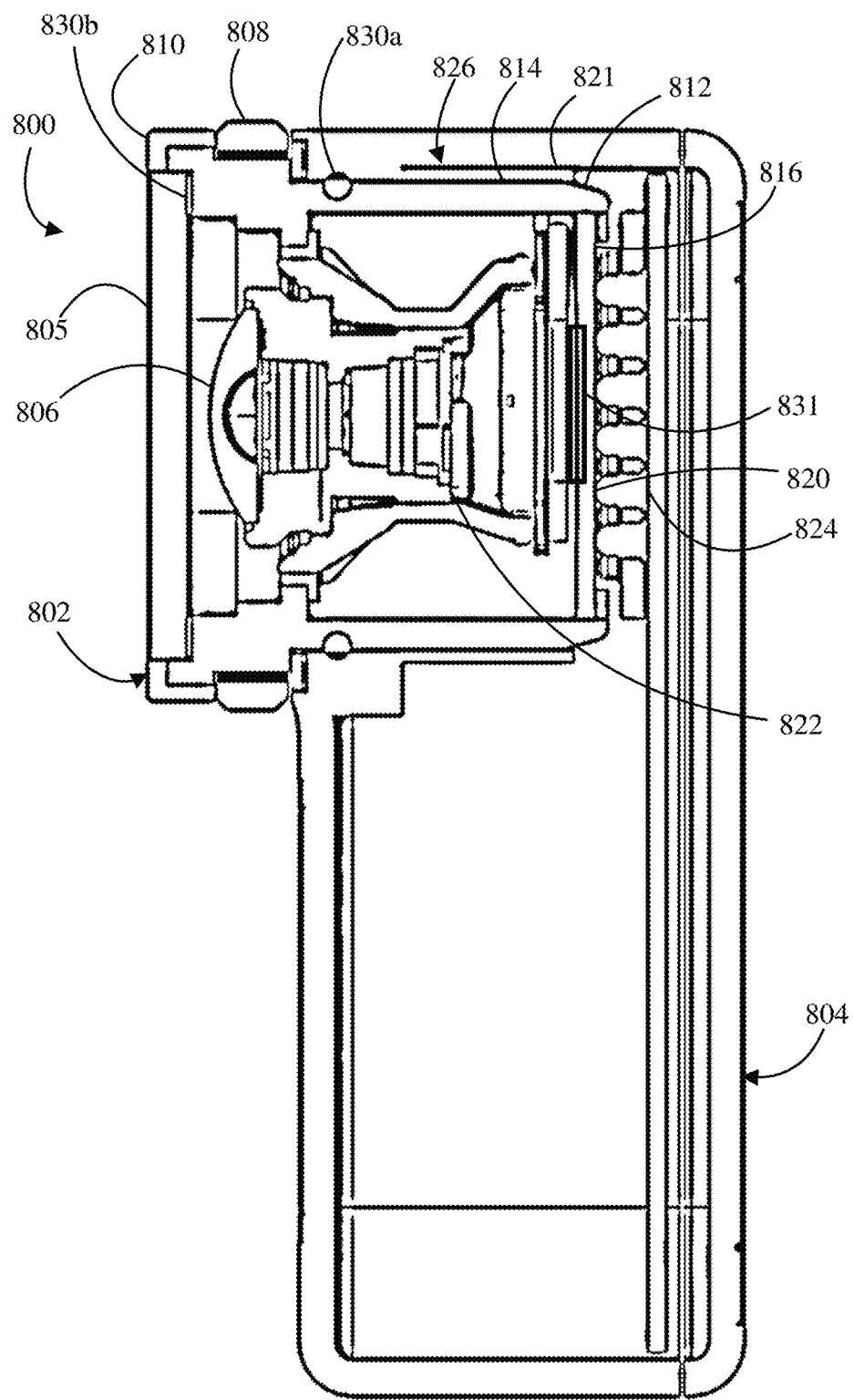
FIG. 8B is a cross section of a side view of the image capture device 800 and the ILM 802 of FIG. 8A as indicated by the dotted line 8B in FIG. 8A.

FIG. 8B is a cross section of a side view of the image capture device 800 and the ILM 802 of FIG. 8A as indicated by dotted cross-sectional line 8B viewed from the left side of the image capture device 800 in FIG. 8A. Around the ILM 802, a shell 812 encases the internal components of the ILM 802 so that the internal components are free of exposure to outside environmental factors, which may interfere with electronic signal transmission or physical component connections. The shell 812 includes locators 814 that assist with aligning a plate 816 and a module electrical interface 820 inside the body 804 by interfacing or aligning with slots 821. Encased within the shell 812, an image sensor 822 is configured to capture images for the image capture device 800. Inside the body 804, the module electrical interface 820 interfaces or connects with a housing electrical interface 824 in a similar way as the housing electrical interfaces 424, 524 of FIGS. 4B-C and 5C-D.

The image sensors, such as the image sensors 422, 522, 822, and the lenses, such as the lenses 406, 506, 806, in this application may be described as or associated with an image sensor lens assembly (ISLA), and the ISLA may have varying sizes in a given ILM, such as the ILMs 402, 502, 802. Compared to the lens 506 and the image sensor 522 of FIG. 5D, the lens 806 and the image sensor 822 of FIG. 8B are larger, and thus, less space is free of components within the ILM 802 than within the ILM 502. The similarly sized shells 512, 812 allow different sizes of the lenses 506, 806 and the image sensors 522, 822 to be utilized in similarly sized shells 512, 812 so that varying types of images may be captured. In some examples, where ILMs (not shown) vary in size, portions of the ILMs that are outside the receptacles (e.g., the lens 506, 806, the collars 508, 808, or the frames 510, 810 of the ILMs 502, 802) may extend outward at varied lengths or distances so that about 20 percent to about 60 percent of the exterior surfaces of the ILMs are free of contact with the receptacles. Finally, and as shown by comparison of FIGS. 5D and 8B, the image sensors 522, 822 may have varying spaces that separate the image sensors 522, 822 and the walls of the shells 512, 812 or the plates 516, 816 so that image sensors 522, 822 with varying capabilities may be used with the image capture devices 500, 800 in an interchangeable fashion.

Returning to FIG. 8B, inside the body 804, a receptacle 826 houses the ILM 802 and is interface-able or connectable with the collar 808 so that the ILM 802 is releasable from the body 804. At an edge of the receptacle 826, a seal 830a adhered to the shell 812 creates a friction or watertight fit with the receptacle 826 in a manner similar to that of the seals 430a, 430b, 530a, 530b of FIGS. 4C and 5D. Another seal 830b is positioned between the cover lens 805 and the frame 810 so that the lens 806 and other internal components are protected from water, dust, dirt, impact events, or any combination thereof. Between the image sensor 822 and the shell 812 or the plate 816, an electrical connector 831 (e.g., a wire or a connector) provides an electrical connection or interface for transferring electrical signals between the image sensor 822 and the module electrical interface 820.

FIG. 8C is an exploded view of the image capture device 800 of FIG. 8A-8B. For connecting with the ILM 802 of FIGS. 8A-8B, the image capture device 800 includes an upper mount 832 and a lower mount 834 attachable to the body 804 and connectable by fasteners (not shown) at apertures 836a, 836b, 836c of the upper mount 832, the lower mount 834, and the receptacle 826. However, in some examples, the upper mount 832 and the lower mount 834 may be simply welded or adhered together for ease of assembly. For interfacing with the collar 808 of FIGS. 8A-8B, a spring 838 of the lower mount 834 is laterally compressible so that a component of the collar 808 can enter inserts 840a, 840b and lock the collar 808 against the receptacle 826. On the outwardly facing portion of the upper mount 832, pairs of recesses 842a, 842b assist with connecting to balls 844a, 844b of the collar, as shown in FIGS. 8A-8C, and provide haptic feedback to the user to support a determination as to whether the ILM 802 is properly secured between the frame 810 and the receptacle 826. At a lateral wall of the receptacle 826, one of the slots 821 for connecting with one of the locators 814 of FIG. 8B and aligning the housing electrical interface 824 with the module electrical interface 820 of FIG. 8B is shown for providing guidance to the user as to whether the ILM 802 is properly positioned.

FIG. 8D is an exploded view of the ILM 802 of FIGS. 8A and 8B. FIG. 8E is an exploded view of the ILM 802 of FIGS. 8A, 8B, and 8E. The collar 808 is rotatable relative to the cover lens 805, the lens 806, the frame 810, and the shell 812 so that the collar 808 is connectable or interface-able with the upper mount 832, the lower mount 834, and the receptacle 826 of FIG. 8C. As the collar 808 rotates, the recess 842a connects with the ball 844a when the collar 808 locks with the receptacle 826 of FIG. 8C. When the collar 808 locks, a snap sound can be heard as the ball 844a is shifted between the pair of recesses 842a so that a user knows that the collar 808 is secured on the receptacle 826. In a similar way to the pair of recesses 842a and the ball 844a, the pair of recesses 842b of FIG. 8C connect with a ball 844b on another side of the collar 808, and the pair of recesses 842b and the ball 844b snap together. When the snap sound from the pairs of recesses 842a, 842b based on movement of the balls 844b, 844b is heard by the user, the user knows that a hook 846 of the collar 808 has fully interfaced with the upper mount 832, the lower mount 834, and the receptacle 826. Before the user engages the collar 808, the user knows that the module electrical interface 820 is aligned by the locators 814 with the slots 821 of FIG. 8B-8C so that a sufficient electrical connection or interface is made.

Figure 8F:
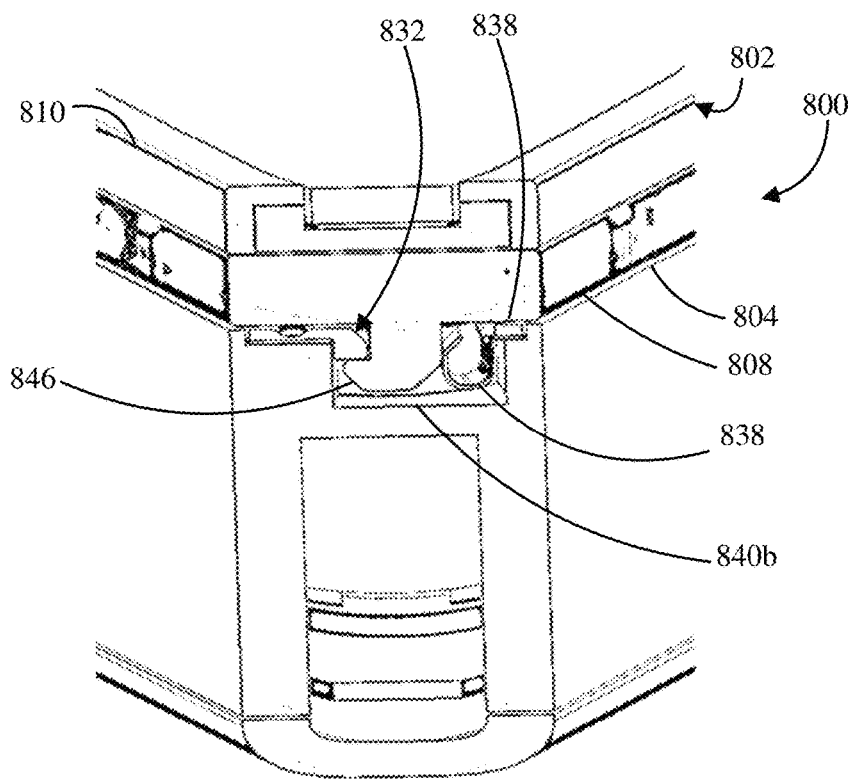
FIG. 8F is a sectional view of the image capture device 800 and the ILM 802 of FIGS. 8A-8D showing the spring 838 and the hook 846 in a locked position as indicated by dotted cross-sectional line 8F viewed from the side of an upper right corner of the image capture device 800 in FIG. 8A.

FIG. 8F is a sectional view of the image capture device 800 and the ILM 802 of FIGS. 8A-8D showing the spring 838 and the hook 846 in a locked position as indicated by dotted cross-sectional line 8F viewed from the side of an upper right corner of the image capture device 800 in FIG. 8A. When the hook 846 enters the insert 840b, the slanted portion of the hook 846 contacts the slanted portion of the spring 838, and the combination of downward forces from entry and lateral forces from the spring 838 slide the hook 846 into the locked position. On the collar 808, a distal portion of the hook 846 is positioned between the insert 840b and the upper mount 832 to form the locked position. In the locked position, the spring 838 of the lower mount 834 applies a compressible force against another portion of the hook 846 to keep the hook 846 locked under the upper mount 832. In the locked position, the collar 808, the body 804, and the frame 810 are substantially flush on a lateral side of the image capture device 800, and the ILM 802 is secured to the body 804.

Figure 8G:
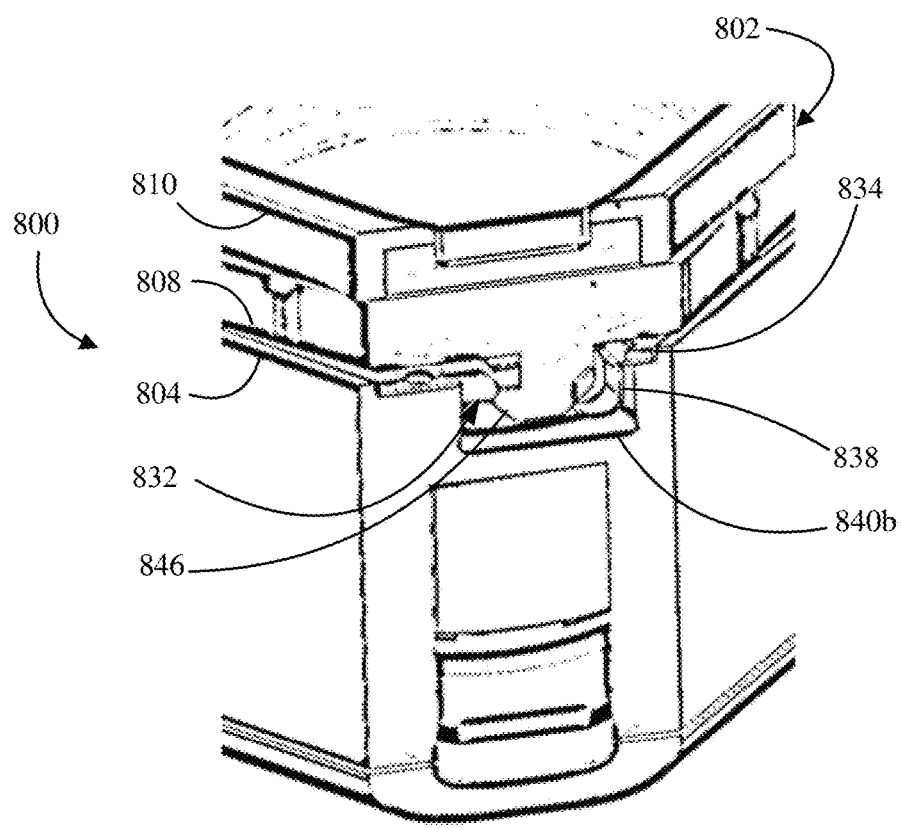
FIG. 8G is a sectional view of the image capture device 800 and the ILM 802 of FIGS. 8A-8F showing the spring 838 and the hook 846 in a released position as indicated by the dotted cross-sectional line 8G viewed from the side of an upper right corner of the image capture device 800 in FIG. 8A.

FIG. 8G is a sectional view of the image capture device 800 and the ILM 802 of FIGS. 8A-8F showing the spring 838 and the hook 846 in a released position as indicated by the dotted cross-sectional line 8G viewed from the side of an upper right corner of the image capture device 800 in FIG. 8A. To move the hook 846 into the released position, a user rotates the collar 808 about 5 degrees to about 15 degrees, and in one example, about 7 degrees counterclockwise, which moves the distal portion of the hook 846 to a position that is free of contact with the upper mount 832. As the distal portion of the hook 846 moves, the spring 838 compresses, and the hook 846 becomes removable from the insert 840b of the receptacle 826 (FIGS. 8B and 8C). When the hook 846 is in a released position, the collar 808 is rotated about 7 degrees, and the collar 808 is offset from the body 804 and frame 810 so that the recesses 842a, 842b and the balls 844a, 844b of FIGS. 8C-8E are not interfaced or engaged, which would inhibit release-ability. Further, in the released position, the ILM 802 is removable from the body 804 of the image capture device 800.

Figure 9A:
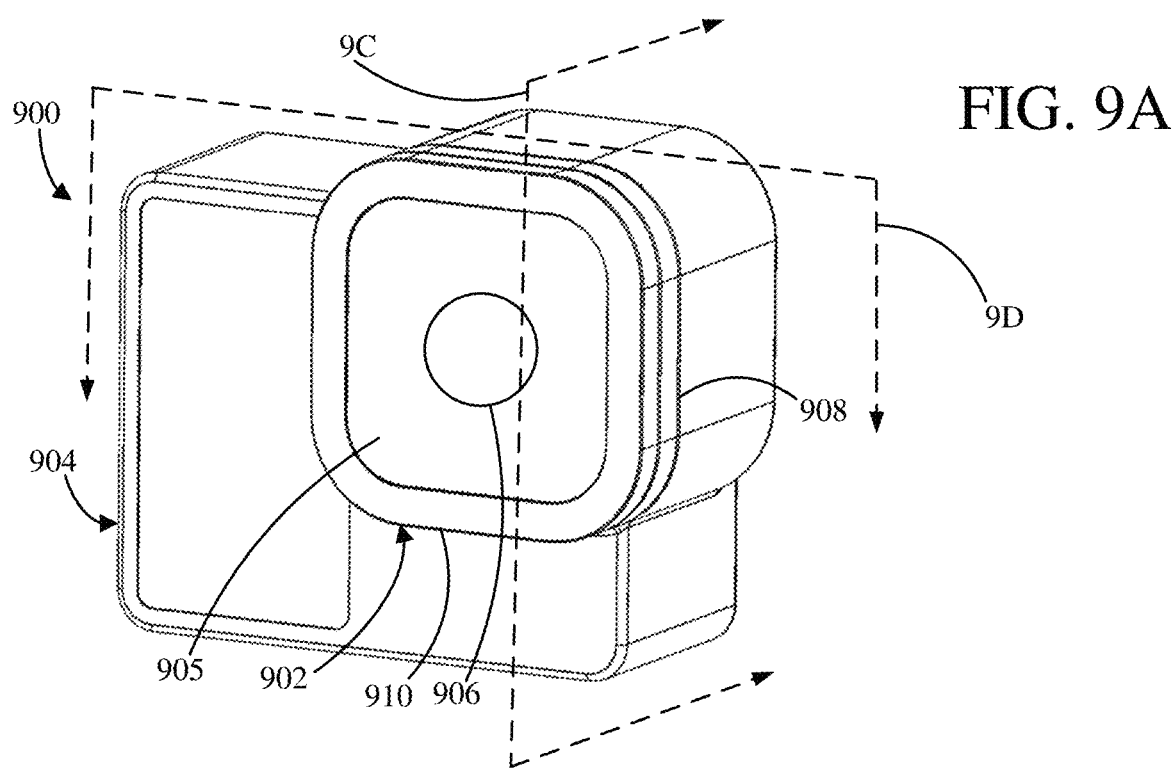
FIG. 9A is a perspective view of an image capture device 900, such as the image capture devices 100, 200 of FIGS. 1-2B, and an ILM 902 that is has a keyed connection.

FIG. 9A is a perspective view of an image capture device 900, such as the image capture devices 100, 200 of FIGS. 1-2B, and an ILM 902 that has a keyed connection. A body 904 houses the ILM 902 so that a cover lens 905 and a lens 906 are usable to capture images. Between the cover lens 905 and the body 904, a collar 908 is rotatable relative to the body 904 and a frame 910 to allow locking and unlocking of the ILM 902. The lens 906 and the frame 910 may be similar to the lenses 406, 506, 606, 706, 806 and the frames 410, 510, 610, 710, 810 of FIGS. 4A-8G. For gripping any release mechanism, the collar 908 may include protrusions (not shown) similar to the protrusions 611a, 611b, 811 of FIGS. 6A-6B and 8A-8G.

Figure 9B:
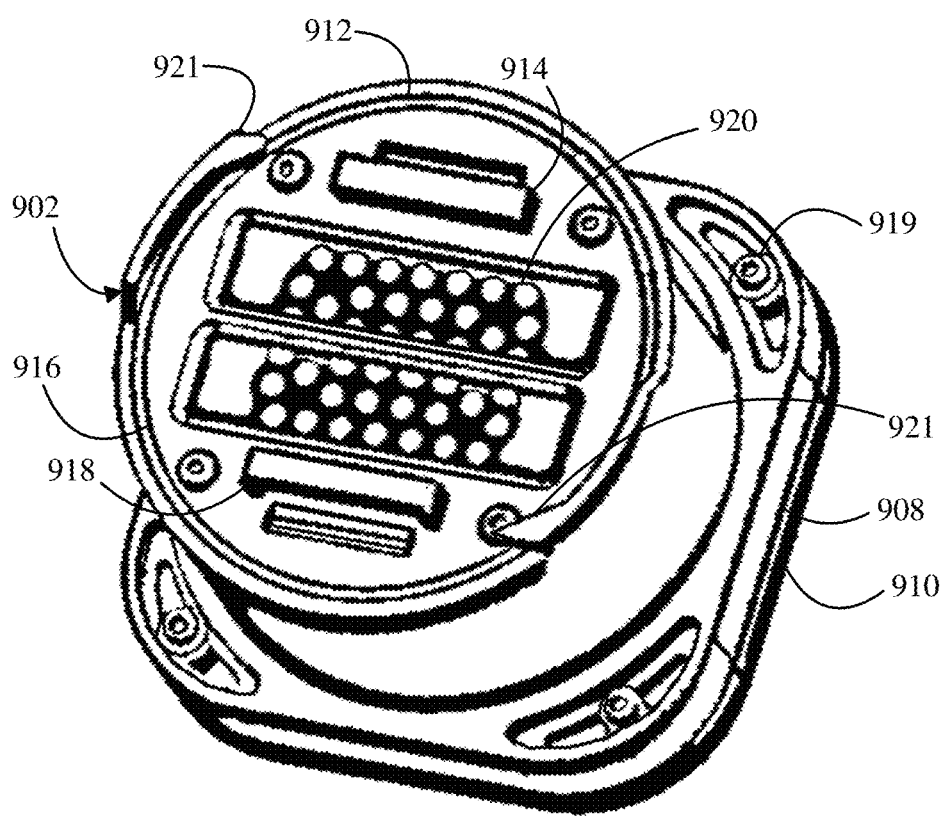
FIG. 9B is perspective view of the ILM 902 of FIGS. 9A.

FIG. 9B is perspective view of the ILM 902 of FIGS. 9A. A shell 912 is surrounded by the collar 908, and the collar 908 is rotatable or shift-able around the shell 912. For connecting to internal components of the body 904 of FIG. 9A, clips 914 are positioned on a plate 916 that is connected or secured to the shell 912 by fasteners 918. Additional fasteners 919 connect the shell 912 and the collar 908 at openings of the collar 908 that are proximate to the frame 910. The collar 908 is rotatable at the fasteners 919 so that a module electrical interface 920 is connectable or interface-able with the body 904 of FIG. 9A. As the collar 908 shifts or rotates about the fasteners 919, the module electrical interface 920 remains non rotatable. When the collar 908 rotates, keys 921 can trigger an internal mechanism of the body 904 of FIG. 9A so that the ILM 902 can be removed or inserted into the body 904.

Figure 9C:
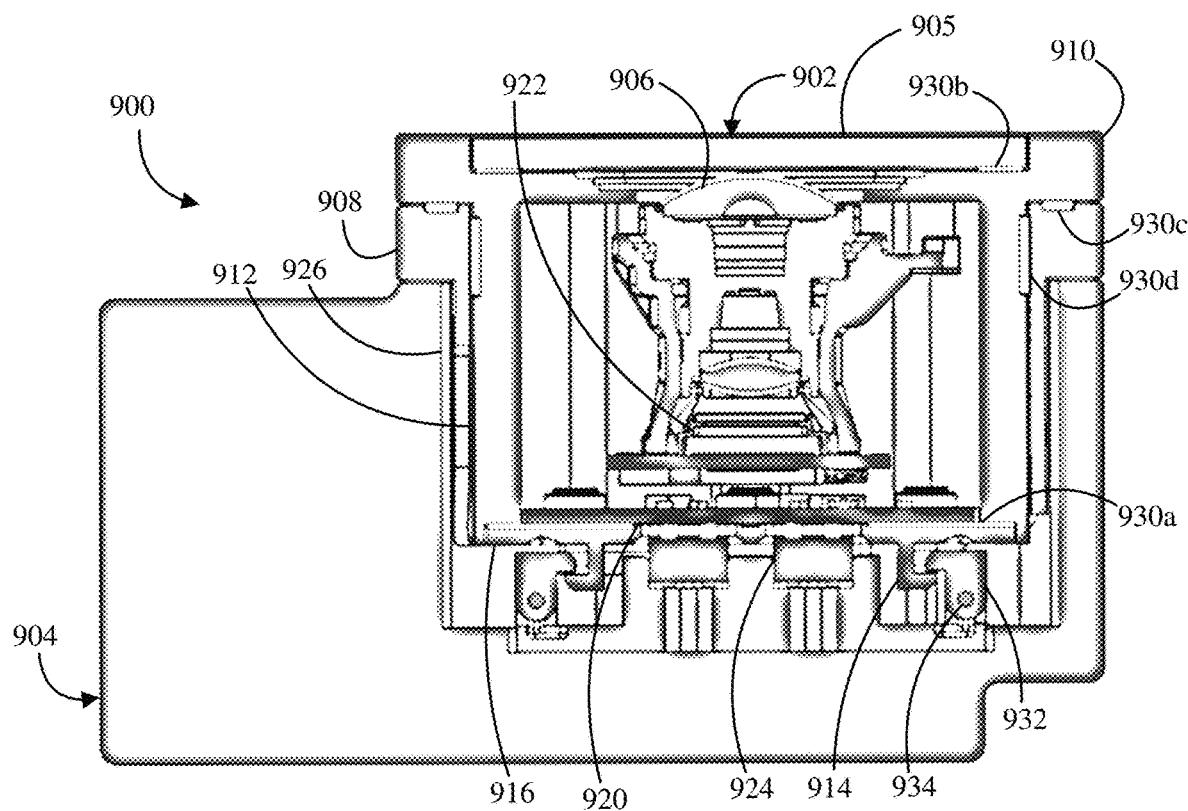
FIG. 9C is a cross section of a side view of the image capture device 900 and the ILM 902 of FIGS. 9A-9B as indicated by dotted cross-sectional line 9C viewed from the left side of the image capture device 900 of FIG. 9A.

FIG. 9C is a cross section of a side view of the image capture device 900 and the ILM 902 of FIGS. 9A-9B as indicated by dotted cross-sectional line 9C viewed from the left side of the image capture device 900 of FIG. 9A. An image sensor 922 is encased by walls of the shell 912 so that the image sensor 922 is free of contact with outside environmental forces such as dust, moisture, water, dirt, or any combination thereof. At the plate 916 of the ILM 902, the module electrical interface 920 forms an electrical connection or interface with a housing electrical interface 924 in a receptacle 926 so that electrical signals related to capturing images may be sent between the ILM 902 and the body 904. The connection or interface between the module electrical interface 920 and the housing electrical interface 924 may be similar to the connection or interface between the module electrical interfaces 420, 520, 820 and the housing electrical interface 424, 524, 824 of FIGS. 4A-5E and 8A-8G.

Since the collar 908 extends from a top portion of the frame 910 to a bottom portion of the frame 910 and substantially covers the shell 912 that is included with the frame 910, a seal 930a is provided between the frame 910 and the plate 916, and another seal 930b is provided between the cover lens 905 and the frame 910. The seals 930a, 930b extend radially between the components and prevent water from entering the inside of the shell 912, which may damage the image sensor 922. To keep water and moisture out of the inside of the receptacle 926 during operation of the image capture device 900, additional seals 930c, 930d are provided between the frame 910 and the collar 908. In this example, further seals (not shown) may be provided proximate to the housing electrical interface 924 and configured to prevent water entry so that the water or moisture does not interfere with electrical components of the housing electrical interface 924.

Inside of the receptacle 926 of the body 904, the clips 914 are connectable with locks 932 that are rotatable for keying the connection between the ILM 902 and the body 904. The locks 932 secure the ILM 902 inside the body 904 during use of the image capture device 900. The locks 932 are rotatable towards and away from the clips 914 by utilizing springs 934; however, the locks 932 could utilize any mechanism suitable to allow rotational movement in a similar way to the springs 934. For engaging with the locks 932, the collar 908 extends from the frame 910 to the plate 916 so that the keys 921 of FIG. 9B are interface-able with the locks 932.

Figure 9D:
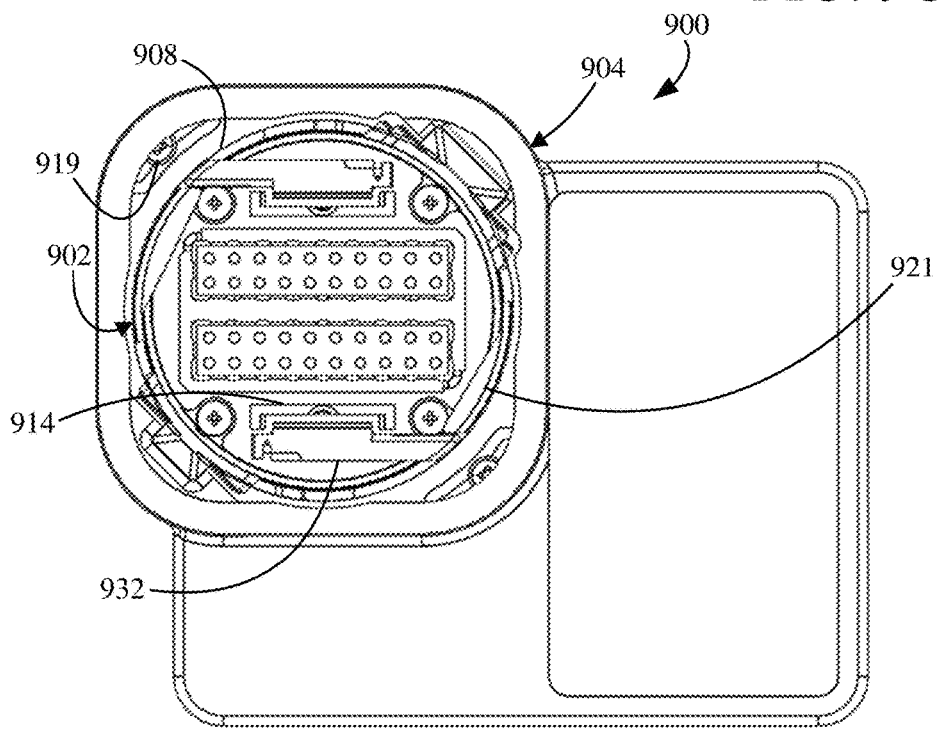
FIG. 9D is another cross section of a rear view of the image capture device 900 and the ILM 902 of FIG. 9A-C as indicated by dotted cross-sectional line 9D viewed from the back side of the image capture device 900 of FIG. 9A.

FIG. 9D is another cross section of a rear view of the image capture device 900 and the ILM 902 of FIG. 9A-C as indicated by dotted cross-sectional line 9D viewed from the back side of the image capture device 900 of FIG. 9A. The fasteners 919 assist with rotational motion of the collar 908 so that the locks 932 are interface-able. At the fasteners 919, the collar 908 is rotatable, and as the collar 908 rotates, the key 921 engages the lock 932. As the collar 908 rotates and becomes offset with the frame 910 of FIGS. 9A-9B, the key 921 pushes and rotates the lock 932 away from the clip 914 so that the ILM 902 becomes disconnect-able. In a similar way, as the collar 908 is rotated back into a flush position with the frame 910 of FIGS. of 9A-9B, the key 921 allows the lock 932 to move back into engagement with the clip 914 so that the ILM 902 is fully connected to body 904 of the image capture device 900.

Figure 10A:
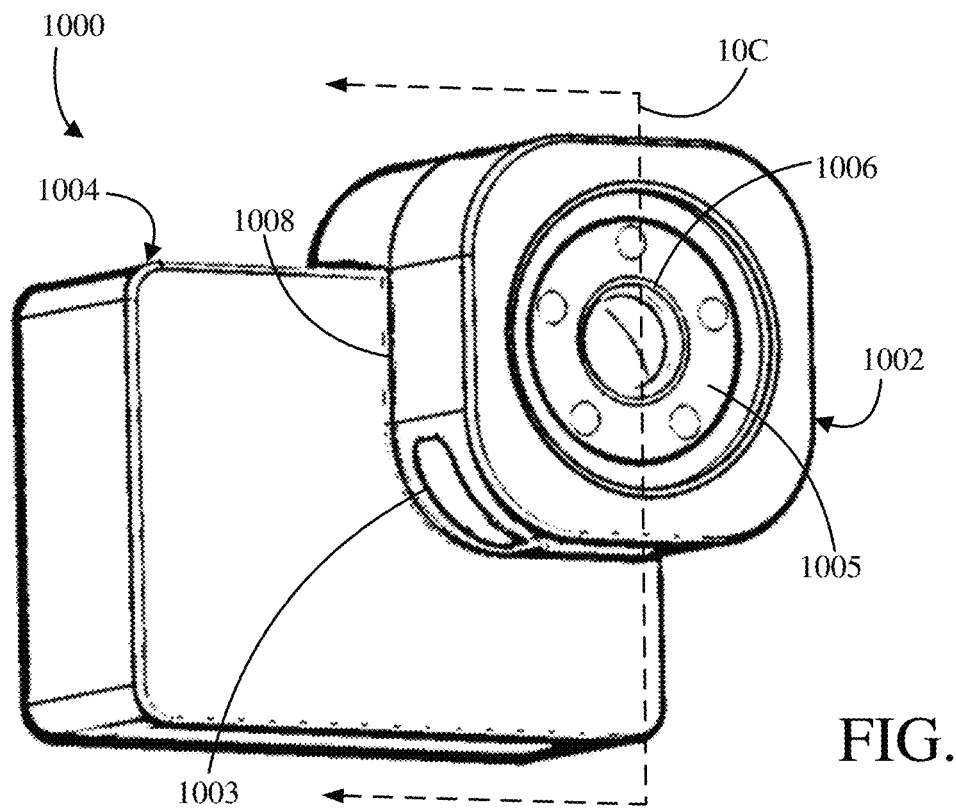
FIG. 10A is a perspective view of an image capture device 1000 and an ILM 1002 that includes a button 1003.

FIG. 10A is a perspective view of an image capture device 1000, such as the image capture devices 100, 200 of FIGS. 1-2B, and an ILM 1002 that includes a button 1003. For capturing images or videos, a body 1004 is connectable with the ILM 1002 that includes a cover lens 1005 and a lens 1006, and the cover lens 1005 and the lens 1006 are non-rotatable. To control the connect-ability of the ILM 1002 with the body 1004, a collar 1008 that is rotatable around the cover lens 1005 includes the button 1003 for engaging and disengaging the ILM 1002 with or from the body 1004. The collar 1008 may be similar to the collars 408, 508, 608, 708, 808, 908 of FIGS. 4A-9D. When the button 1003 is pressed or engaged, the collar 1008 is rotatable around the cover lens 1005, and the ILM 1002 is insert-able or removable from the body 1004.

Figure 10B:
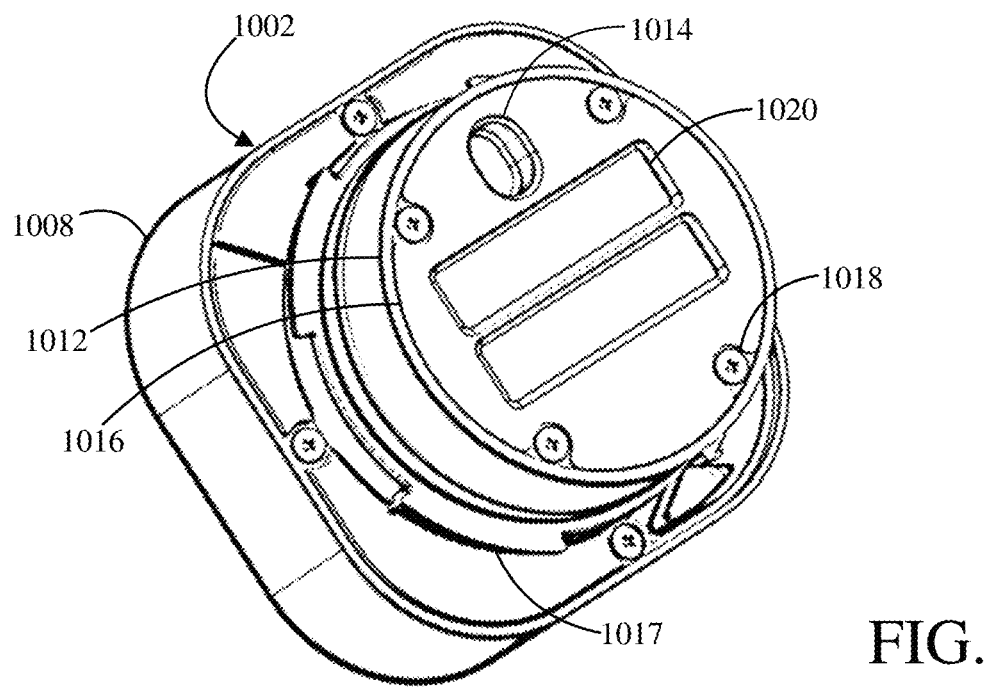
FIG. 10B is a perspective view of the ILM 1002 of FIG. 10A.

FIG. 10B is a perspective view of the ILM 1002 of FIG. 10A. To encase components within the ILM 1002, a shell 1012 surrounds internal components of the ILM 1002, and a slot 1014 on a distal end of the ILM 1002 is mate-able with the body 1004 of FIG. 10A so that the shell 1012 is align-able with internal components of the body 1004. Also at the distal end of the ILM 1002, a plate 1016 is connected to the shell 1012, and the plate 1016 provides a physical barrier to separate internal components of the body 1004 of FIG. 10A from outside forces. On the shell 1012, a mounting mechanism 1017 is included that is interface-able with a bayonet or other mount (not shown). The plate 1016 utilizes fasteners 1018 to secure a module electrical interface 1020 to the ILM 1002, and the module electrical interface 1020 may be similar to the module electrical interfaces 420, 520, 820, 920. of FIGS. 4A-5E and 8A-9D.

Figure 10C:
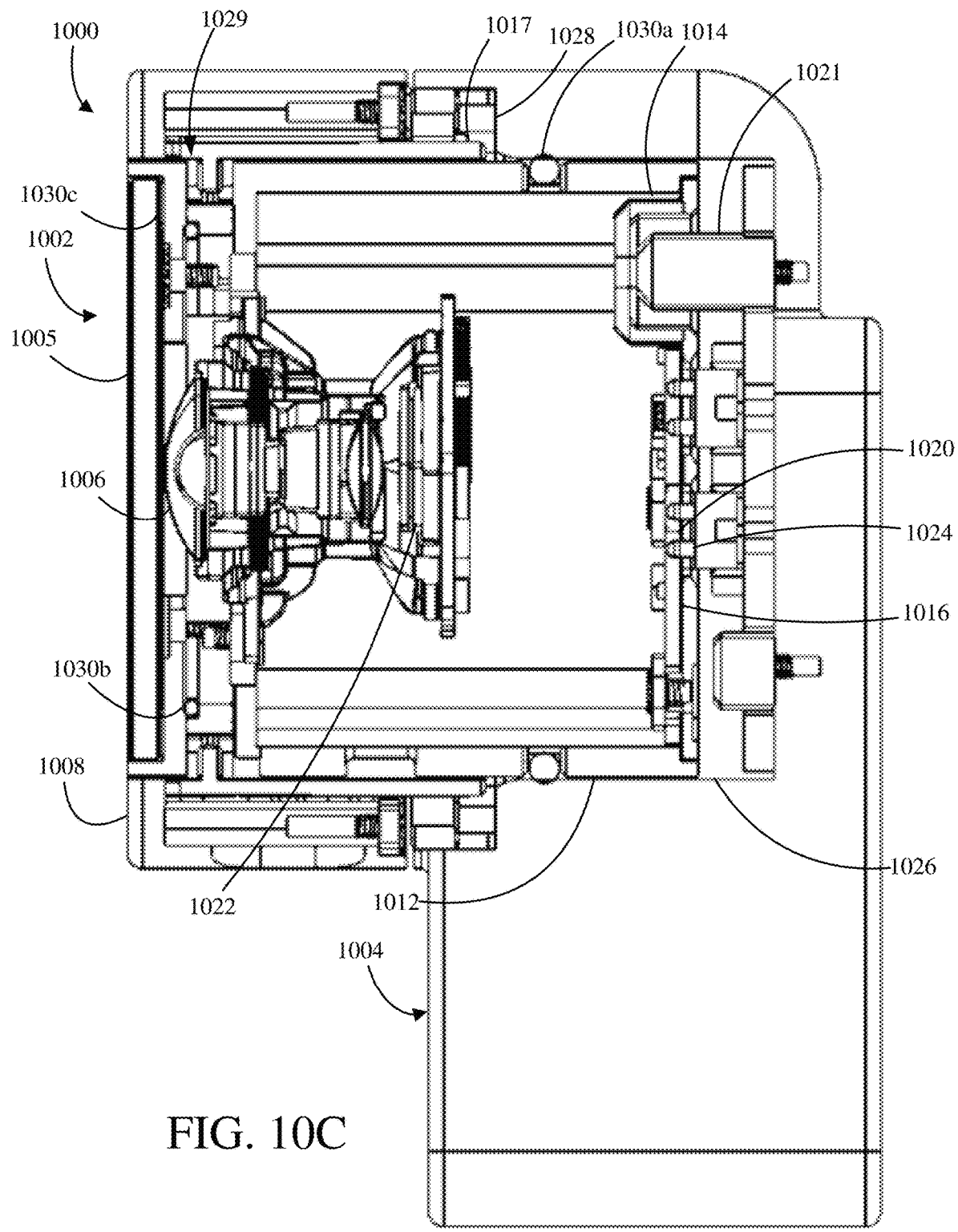
FIG. 10C is a cross-section of a side view of the ILM 1002 and the image capture device 1000 of FIGS. 10A-10B as indicated by dotted cross-sectional line 10C viewed from the left side of the image capture device 1000 of FIG. 10A.

FIG. 10C is a cross-section of a side view of the ILM 1002 and the image capture device 1000 of FIGS. 10A-10B as indicated by dotted cross sectional line 10C viewed from the left side of the image capture device 1000 of FIG. 10A. To properly align the ILM 1002 with the body 1004, a locator 1021 guides the ILM 1002 by fitting with the slot 1014. The fit between the locator 1021 and the slot 1014 may be a tight or a loose fit, and the fit may contact at a bottom wall of the locator 1021, a lateral wall(s) of the locator 1021, or any combination thereof. Within the ILM 1002, an image sensor 1022 is included that is encased by the shell 1012 and the plate 1016 so that exposure to the outside environment is mitigated. For sending signals from the body 1004, a housing electrical interface 1024 connects or interfaces with the module electrical interface 1020, and the connection or interface between the module electrical interface 1020 and the housing electrical interface 1024 is protected from electromagnetic interference, which is emitted by the image sensor 1022, by the plate 1016. Specifically, the shell 1012 is insert-able to a receptacle 1026 and creates a watertight or friction fit by the seal 1030a of the shell 1012, and another seal 1030b provides a watertight fit between the frame 1010 and the shell 1012 so that the image sensor 1022 is protected. In addition, another seal 1030c is positioned between the cover lens 1005 and the frame 1010 so that the lens 1006 is protected from impact events, water, dust, dirt, or any combination thereof. The seals 1030a, 1030b, 1030c may be similar to the seals 430a, 430b, 430c, 530a, 530b, 530c of FIGS. 4A-5E. At a bayonet 1028, which is positioned on a distal end or outer surface of the receptacle 1026, the mounting mechanism 1017 forms a mechanical connection to the bayonet 1028 that secures the ILM 1002 to the body 1004. Between the shell 1012 and the collar 1008, a bearing system 1029 allows for rotational movement of the collar 1008 about the shell 1012 so that the collar 1008 is shift-able or rotatable around the shell 1012.

Figure 10D:
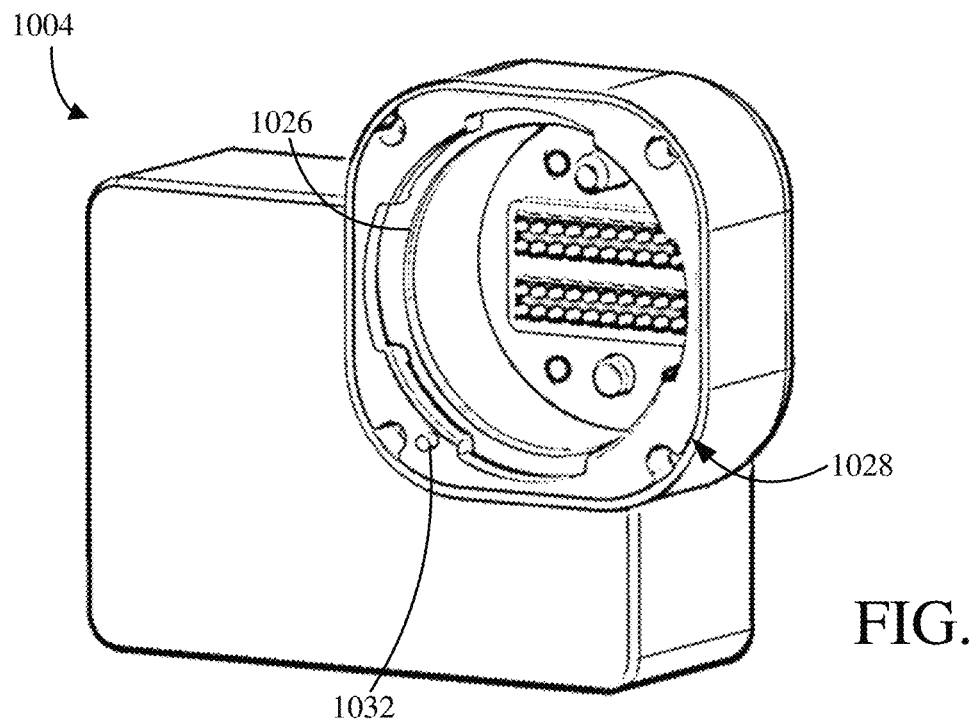
FIG. 10D is a perspective view of the body 1004 of FIGS. 10A and 10C that shows the bayonet 1028.
Figure 10E:
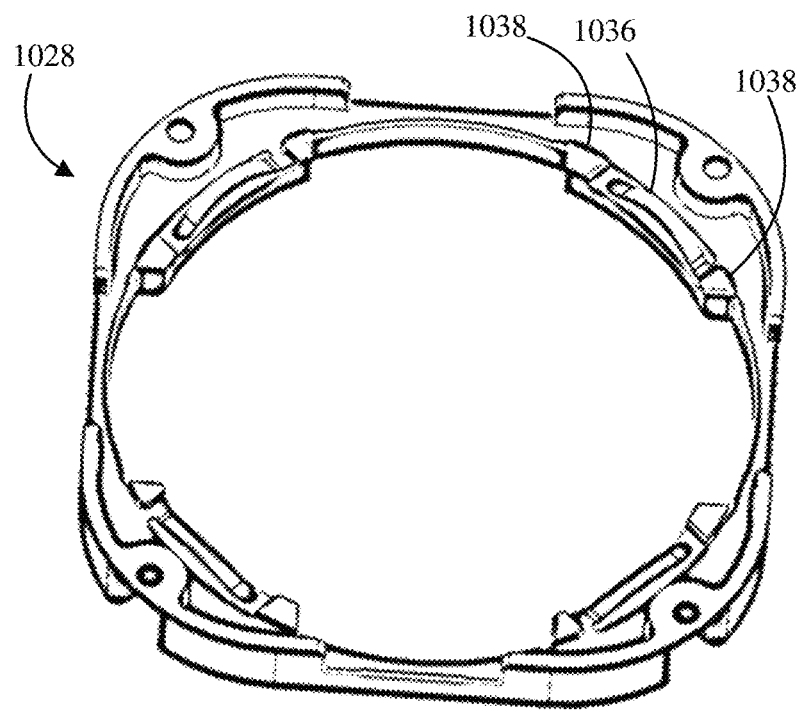
FIG. 10E is a perspective view of the bayonet of FIGS. 10A, 10C, and 10D.

FIG. 10D is a perspective view of the body 1004 of FIGS. 10A and 10C that shows the bayonet 1028. FIG. 10E is a perspective view of the bayonet of FIGS. 10A, 10C, and 10D. On a top surface of the bayonet 1028, a locking pin 1032 extends perpendicularly from an external surface of the bayonet 1028 and can interface with the button 1003 of FIG. 10A. On a bottom surface of the bayonet 1028, springs 1036 are positioned between rotational stoppers 1038 at each corner of the bayonet 1028, and the springs 1036 and the rotational stoppers 1038 are connectable or interface-able with the mounting mechanism 1017 of FIGS. 10B and 10C so that the ILM 1002 is securable to the body 1004 and rotation of the ILM 1002 is limited by the rotational stoppers 1038.

Figure 10F:
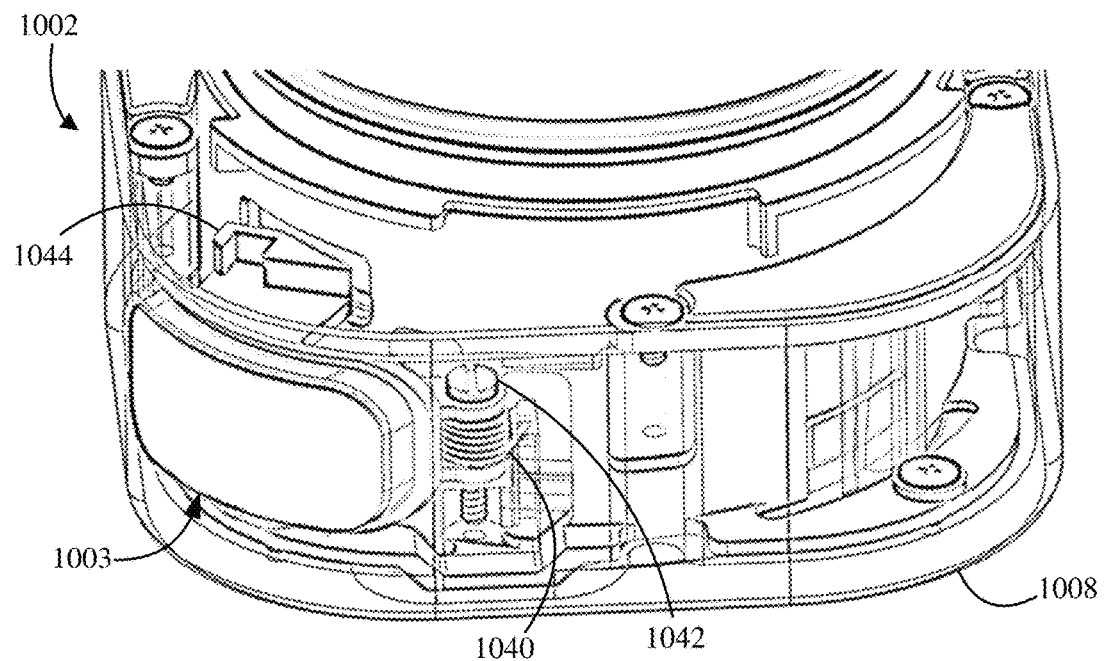
FIG. 10F is perspective view of the ILM 1002 of FIGS. 10A-10C with the collar 1008 shown as transparent.

FIG. 10F is perspective view of the ILM 1002 of FIGS. 10A-10C with the collar 1008 shown as transparent. On the collar 1008, the button 1003 can be pushed, depressed, or compressed towards a central axis or imaging axis (not shown) of the ILM 1002 and can control the connect-ability of the ILM 1002. For allowing push-ability or compressibility, a coil 1040 secured by a fastener 1042 provides external pressure or force on the button 1003 so that, when then button 1003 is pushed or compressed inward, the button 1003 will then be forced outward or away from the imaging axis as the pressure or force that is pushing or compressing the button 1003 is released. For connecting with the locking pin 1032 of FIGS. 10D and 10E, the button 1003 includes a hook 1044 that is positioned on an exterior of the collar 1008.

Figure 10G:
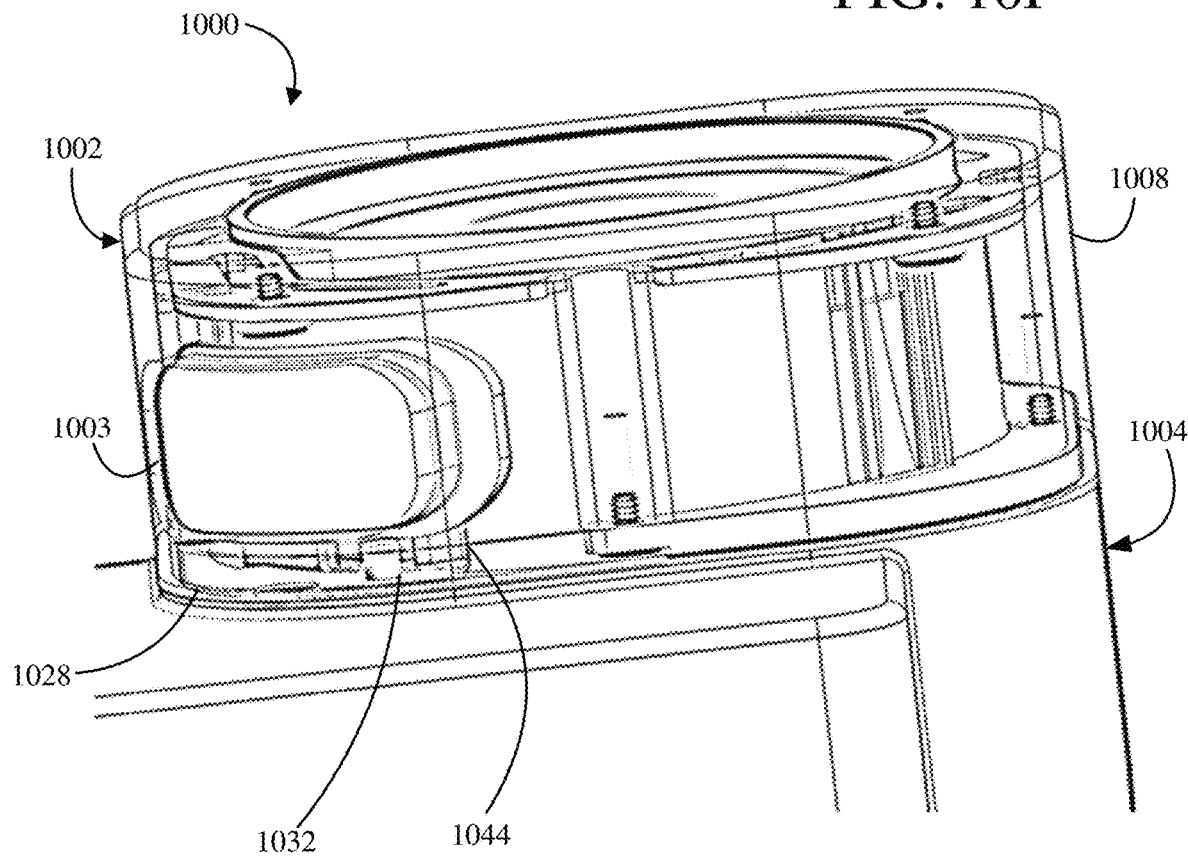
FIG. 10G is a side view of the image capture device 1000 of FIGS. 10A-10F with the collar 1008 shown as transparent.

FIG. 10G is a side view of the image capture device 1000 of FIGS. 10A-10F with the collar 1008 shown as transparent. To connect the ILM 1002 and the body 1004, the ILM 1002 is inserted into the body 1004, and corners of the collar 1008 are positioned at a 15 degree to a 90 degree angle, for example, at a 45 degree angle, relative to a flush position of the collar 1008 (e.g., FIG. 10A). To lock the ILM 1002 and the body 1004, the collar 1008 is rotated until corners of the collar 1008 are flush with corners of the body 1004. As the collar 1008 is moved to a flush position, a slanted portion of the button 1003 slides the locking pin 1032 of the bayonet 1028 into the hook 1044 so that the locking pin 1032 and the hook 1044 prevent rotational motion of the collar 1008. For axial movement (in a z-direction or along a direction of an imaging axis), the bayonet 1028 engages or interfaces with the mounting mechanism 1017 of FIG. 10C so that the ILM 1002 and the body 1004 are non-separable when the corners of the body 1004 and the collar 1008 are flush. To disconnect, disengage, or uninstall the ILM 1002 from the body 1004, pressure is applied to the button 1003, and the collar 1008 is twisted simultaneously, which releases the locked condition of the locking pin 1032 and the hook 1044 and disengages the interface of the collar 1008 and the bayonet 1028.

Figure 11A:
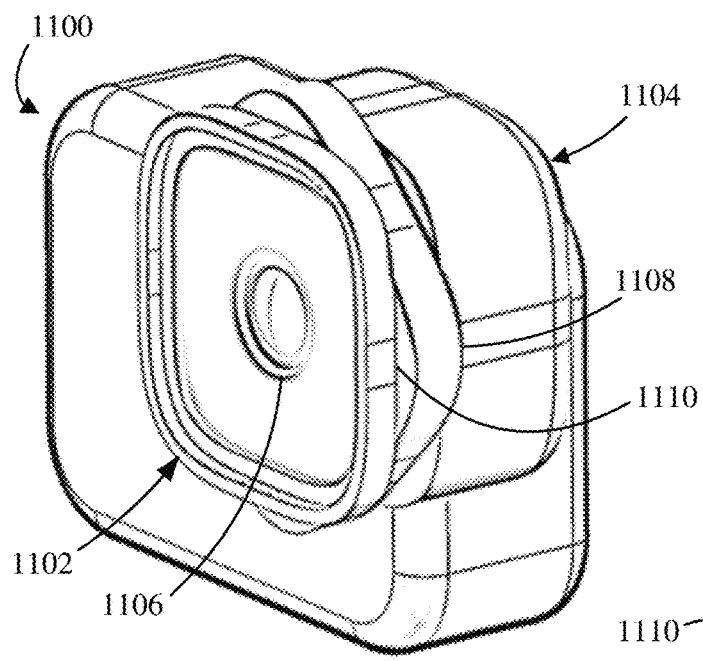
FIG. 11A is perspective view of an image capture device 1100 and an ILM 1102 in a shifted position.

FIG. 11A is perspective view of an image capture device 1100, such as the image capture devices 100, 200 of FIGS. 1-2B, and an ILM 1102 in a shifted position. A body 1104 secures the ILM 1102 so that a lens 1106 is non-rotatable. Between the lens 1106 and the body 1104, a collar 1108 is in a shifted position relative to a frame 1110 at about 30 degrees to about 90 degrees, for example, at about 45 degrees as shown. In other examples, where the collar 1108 is in a locked position, the collar 1108 would be flush with the body 1104 and the frame 1110.

Figure 11B:
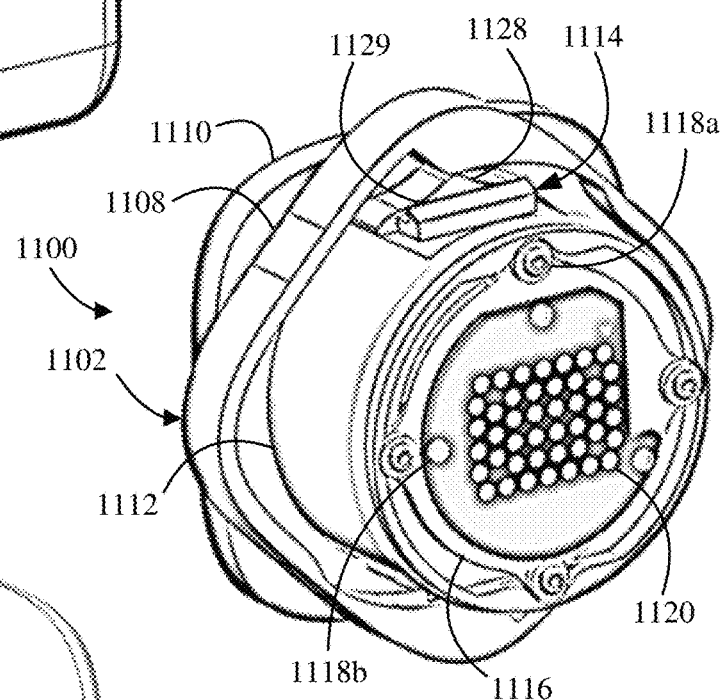
FIG. 11B is a perspective view of the ILM 1102 of FIG. 11A.
Figure 11C:
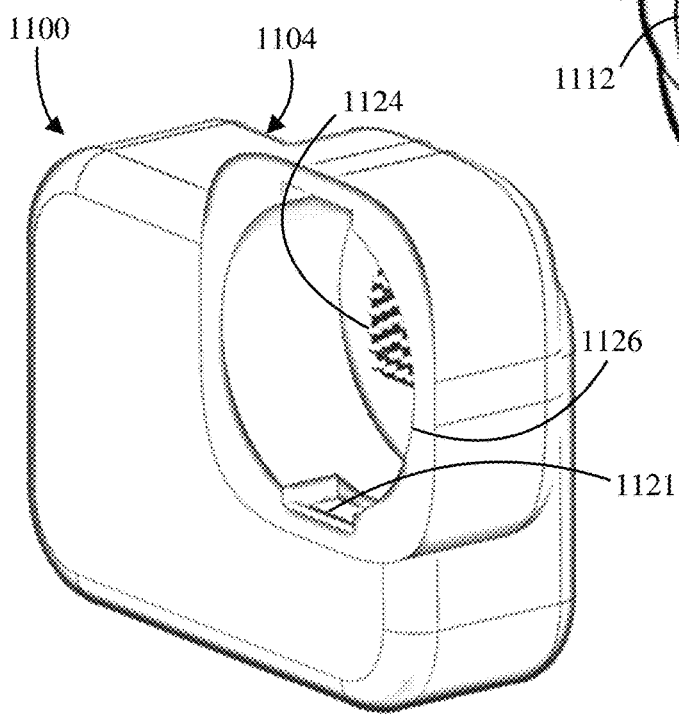
FIG. 11C is a perspective view of the body 1104 of FIG. 11A.

FIG. 11B is a perspective view of the ILM 1102 of FIG. 11A. FIG. 11C is a perspective view of the body 1104 of FIG. 11A. Again, the collar 1108 is shifted relative to the frame 1110, which alters the position of a locator 1114. On the ILM 1102, a shell 1112 extends between the frame 1110, the locator 1114, and a plate 1116 and provides a secure casing for internal components, such as the image sensors 422, 522, 822, 922, 1022 of FIGS. 4A-5E and 8A-10G. The locators 1114 are positioned both in a manner spaced from and above a lateral side of the shell 1112, and the locators 1114 may be pushed away from the lateral side of the shell 1112 by one or more compression springs (not shown) so that the locators 1114 remain spaced from the lateral side of the shell 1112 when free of downward force or pressure. Fasteners 1118a secure the plate 1116 to the shell 1112 to fully encase the internal components. Other fasteners 1118b are used to secure a module electrical interface 1120 to the plate 1116, and the plate 1116 provides a shield for preventing or mitigating stray signals emitting from the internal components, such as the image sensor (not shown), from interfering with the module electrical interface 1120. The module electrical interface 1120 may be similar to the module electrical interfaces 420, 520, 820, 920, 1020 of FIGS. 4A-5E and 8A-10G.

On the body 1104, slots 1121 are interface-able or connectable with the locators 1114 of the ILM 1102. When the locators 1114 and the slots 1121 are interfaced or connected, the ILM 1102 presses the module electrical interface 1120 into a housing electrical interface 1124 so that electrical signals may be sent between the ILM 1102 and the body 1104 of the image capture device 1100. To engage the ILM 1102 to a receptacle 1126 of the body 1104, a corner of the collar 1108 presses a cam surface 1128 of the locator 1114. As the cam surface 1128 is pressed, the locator 1114 moves into contact with a lateral wall of the shell 1112 so that the ILM 1102 is insert-able into the receptacle 1126. When the ILM 1102 is fully inserted into the receptacle 1126, the collar 1108 is rotated back to a non-shifted or locked position, such as the locked positions shown in FIGS. 5B, 6A, 7, 8A, 9A, and 10A, and pressure on the cam surface 1128 is relieved so that a hook 1129 of the locator 1114 connects or interfaces with a deeper portion of the slot 1121. The cam surface 1128 and the hook 1129 of the locator 1114 may be separate parts or have a contiguous structure so that assembly of the locator 1114 is optimized. In some examples, a seal (e.g., seals 430a, 530a, 830a of FIGS. 4A-5E and 8A-8G) is provided that radially surrounds the shell 1112 between the plate 1116 and the slot 1121 and creates a watertight or friction fit with the receptacle 1126 so that environmental factors such as moisture, water, dust, dirt, or any combination are kept away from the module electrical interface 1120, the housing electrical interface 1124, or both.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
   a housing that defines a receptacle having a housing electrical interface;
   a mechanical coupling mechanism coupled to or connected with the housing at a location of the receptacle;
   an interchangeable lens module configured for releasable connection with the mechanical coupling mechanism, the interchangeable lens module including a module electrical interface and an imaging sensor;
   a seal positioned between a lateral wall of the interchangeable lens module and a wall of the receptacle; and
   a collar rotatable independently of and about the interchangeable lens module and lockable to the mechanical coupling mechanism to secure the interchangeable lens module to the housing, couple the module electrical interface to the housing electrical interface, and waterproof the interchangeable lens module against the receptacle at the seal.

2. The image capture device of claim 1, wherein the collar comprises:
   springs configured to provide tension between the mechanical coupling mechanism and the interchangeable lens module in a direction parallel to an imaging axis of the interchangeable lens module when the interchangeable lens module is coupled to the housing; and detents configured to locate the collar rotationally about the mechanical coupling mechanism when the interchangeable lens module is coupled to the image capture device, wherein the receptacle comprises a locator extending from a lateral wall of the receptacle, wherein the interchangeable lens module comprises a slot defined in a lateral wall of the interchangeable lens module and configured to interface with the locator, and wherein the slot and the locator assist with aligning the housing electrical interface and the module electrical interface.

3. The image capture device of claim 1, wherein the collar includes a first side and a second side, and wherein the first side is lockable at inserts of the mechanical coupling mechanism by rotate-ably locking hooks of the collar.

4. The image capture device of claim 3, wherein the interchangeable lens module includes a shell positioned adjacent to the second side of the collar, wherein the shell includes pairs of recesses positioned on a side of the shell that faces the collar, and wherein the collar includes a detent positioned on the second side and configured to provide a snap fit with the pairs of recesses of the shell when moving the collar between a secured and an unsecured position.

5. The image capture device of claim 1, wherein the mechanical coupling mechanism has a first side and a second side, wherein the first side including springs surround by stoppers and the second side including a locking pin, wherein the collar includes a mounting mechanism and a button, wherein the mounting mechanism is securable with the springs and stoppers of the mechanical coupling mechanism at the first side, and wherein the button is configured to secure the interchangeable lens module by rotatably securing or unsecuring the button to or from the locking pin.

6. The image capture device of claim 1, wherein the mechanical coupling mechanism includes slots defined within walls of the receptacle, and wherein the collar includes locators lockable with the slots of the mechanical coupling mechanism.

7. The image capture device of claim 1, wherein the mechanical coupling mechanism is positioned at a location adjacent to the housing electrical interface, the mechanical coupling mechanism including locks that are rotatable relative to a base of the receptacle, wherein the interchangeable lens module includes clips positioned at a base of the interchangeable lens module, the clips configured to connect with the locks of the mechanical coupling mechanism, and wherein the collar extends to a bottom edge of the interchangeable lens module, the collar including keys positioned at a base of the collar and adjacent to the bottom edge of the interchangeable lens module, the keys configured to rotate the locks when the collar is rotated relative to the interchangeable lens module so that the interchangeable lens module is securable within the housing.

8. The image capture device of claim 1, wherein the interchangeable lens module includes a locator that is slidably connectable with a slot defined within the receptacle so that the module electrical interface to the housing electrical interface are aligned when the housing and the interchangeable lens module are secured, and wherein the mechanical coupling mechanism includes threads that are rotatably securable with threads of the collar so that rotating the collar about the mechanical coupling mechanism secures the interchangeable lens module to the housing and connects the module electrical interface to the housing electrical interface.

9. The image capture device of claim 1, further comprising:

a plate connected with the lateral wall of the interchangeable lens module, the plate positioned between the imaging sensor so that electromagnetic signals from the imaging sensor is shielded between the imaging sensor and electrical components of the housing, the module electrical interface located at the plate.

10. The image capture device of claim 1, wherein the housing electrical interface is configured to contact the module electrical interface, and wherein the module electrical interface is disposed on a circuit board of the interchangeable lens module that is spaced from an image sensor of the interchangeable lens module such that the contact between the housing electrical interface and the module electrical interface does not impact the image sensor.

11. The image capture device of claim 1, wherein the seal comprises a rubber or other elastic material.

12. An image capture device, comprising:

a housing that defines a receptacle having a housing electrical interface at a base of the receptacle;

locks disposed at the base of the receptacle adjacent to the housing electrical interface;

a lens module, comprising:
 a lens tube;
 a lens disposed in the lens tube;
 an image sensor spaced from the lens along an imaging axis;
 a lens module electrical interface spaced from the image sensor along the imaging axis; and
 clips positioned around the lens module electrical interface; and a collar that surrounds the lens tube, is rotatable about the lens tube, and is securable to the locks so that rotating the collar around the lens tube releases or secures the clips and the locks to insert or remove the lens module to or from the housing, wherein the locks are rotatable relative to the base of the receptacle by springs, and wherein the collar includes keys configured to rotate the locks when the collar is rotated relative to the lens tube so that the locks are released from the clips of the lens module.

13. The image capture device of claim 12, wherein the collar has a rotatable range of about 7 degrees.

14. The image capture device of claim 12, wherein the collar includes openings that are rotate-ably secured with fasteners of the lens module so that the collar is connected to the lens tube and rotatable about lens tube.

15. The image capture device of claim 12, further comprising:

one or more seals positioned between the lens tube and the collar to prevent water or moisture from entering the receptacle.

16. An image capture device, comprising:

a housing that defines a receptacle having an electrical connection and a housing locator within the receptacle;

a mechanical coupling mechanism affixed to a wall of the receptacle;

an interchangeable lens module, comprising:
 a lens tube;
 a lens disposed in the lens tube;
 an image sensor spaced from the lens along an imaging axis;

a lens module that electrically interfaces with the electrical connection of the housing, the lens module spaced from the image sensor along the imaging axis; and a lens module locator configured to mechanically interface with the housing locator so that the lens module electrically interfaces with the electrical connection; and a collar that surrounds the interchangeable lens module, is independent of the lens module locator, rotates independently of the lens module and the lens module locator, and is rotatably lockable against an outer surface of the housing by coupling with the mechanical coupling mechanism.

17. The image capture device of claim 16, wherein the lens module locator is positioned at a base of the receptacle, the lens module locator extended in a position that is generally perpendicular from the base; and wherein the housing locator is configured as a slot defined within a base of the interchangeable lens module, the housing locator configured to guide the interchangeable lens module into an electrical interface with the electrical connection of the housing by connecting with the lens module locator.

18. The image capture device of claim 16, wherein the collar comprises:

hooks extending from the collar and towards the mechanical coupling mechanism; and balls positioned at a location adjacent to each hook and extended towards the mechanical coupling mechanism, and wherein the mechanical coupling mechanism comprises:

a first mechanical coupling mechanism having inserts configured to receive the hooks of the collar and recesses configured to have a snap fit with the balls of the collar; and a second mechanical coupling mechanism secured with the first mechanical coupling mechanism and an edge of the housing at the receptacle, the second mechanical coupling mechanism having springs configured to secure the hooks of the collar between the first mechanical coupling mechanism and the housing, wherein the hooks are disconnectable from the first mechanical coupling mechanism and second mechanical coupling mechanism by rotating the collar so that the balls snap outside of the recesses of the first mechanical coupling mechanism.

19. The image capture device of claim 16, wherein the lens module locator extends away from a lateral wall of the interchangeable lens module and connectable with the housing locator defined within a lateral wall of the receptacle so that the collar can rotatably secure the interchangeable lens module while aligning the electrical connection between the housing and the interchangeable lens module.

20. The image capture device of claim 16, wherein the collar and the mechanical coupling mechanism connect together though a threaded connection.

* * * * *